US010893406B2

(12) United States Patent
Lee et al.

(10) Patent No.: US 10,893,406 B2
(45) Date of Patent: Jan. 12, 2021

(54) METHOD AND APPARATUS FOR HANDLING REMOTE PROFILE MANAGEMENT EXCEPTION

(71) Applicant: Samsung Electronics Co., Ltd., Suwon-si (KR)

(72) Inventors: Hyewon Lee, Suwon-si (KR); Jonghan Park, Suwon-si (KR); Duckey Lee, Suwon-si (KR); Sangsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/658,854

(22) Filed: Oct. 21, 2019

(65) Prior Publication Data
US 2020/0128390 A1  Apr. 23, 2020

(30) Foreign Application Priority Data

Oct. 19, 2018 (KR) .................. 10-2018-0125437
Oct. 31, 2018 (KR) .................. 10-2018-0132539

(51) Int. Cl.
*H04W 24/00* (2009.01)
*H04W 8/18* (2009.01)
(Continued)

(52) U.S. Cl.
CPC ............... *H04W 8/18* (2013.01); *H04W 4/50* (2018.02); *H04W 4/60* (2018.02);
(Continued)

(58) Field of Classification Search
CPC ..... H04W 8/18; H04W 4/50; H04W 12/0023; H04W 48/18; H04W 12/06; H04W 4/60
(Continued)

(56) References Cited

U.S. PATENT DOCUMENTS 9,009,475 B2    4/2015  Hauck et al.
2016/0285493 A1  9/2016  Veneroso
(Continued)

FOREIGN PATENT DOCUMENTS

KR   10-2016-0122061 A   10/2016
WO       2017166906 A1   10/2017

OTHER PUBLICATIONS

International Search Report in connection with International Application No. PCT/KR2019/013822 dated Jan. 30, 2020, 3 pages.
(Continued)

*Primary Examiner* — Amancio Gonzalez

(57) ABSTRACT

The disclosure relates to a communication technique for combining IoT technology with a 5G communication system for supporting a data transmission rate higher than that of a beyond-4G system, and a system therefor. The disclosure is applicable to intelligent services based on 5G communication technology and IoT-related technology (for example, smart homes, smart buildings, smart cities, smart cars or connected cars, health care, digital education, retail businesses, security and safety-related services). A method of a terminal includes receiving a request related to a first function from a profile server; identifying if the first function can be executed; identifying if it is possible to switch to a second function if the first function cannot be executed; and handling the request based on the second function if it is possible to switch to the second function. A terminal includes a transceiver and at least one processor. The at least one processor receives a remote management command from a profile server, determines if the remote management command can be handled, performs the received remote management command, switches the remote management command to a local management command if necessary according to the result of performing the remote management command, and controls the transceiver so as to trans-
(Continued)

mit the result of performing the remote management command or the local management command to the profile server.

20 Claims, 26 Drawing Sheets

(51) Int. Cl.
*H04W 4/60* (2018.01)
*H04W 12/06* (2009.01)
*H04W 48/18* (2009.01)
*H04W 12/00* (2009.01)
*H04W 4/50* (2018.01)

(52) U.S. Cl.
CPC ....... *H04W 12/0023* (2019.01); *H04W 12/06* (2013.01); *H04W 48/18* (2013.01)

(58) Field of Classification Search
USPC ..................................................... 455/414.1
See application file for complete search history.

(56) References Cited

U.S. PATENT DOCUMENTS

| 2017/0222991 | A1  | 8/2017 | Yang |              |
|--------------|-----|--------|------|--------------|
| 2020/0092095 | A1* | 3/2020 | Yang | H04W 12/0609 |

OTHER PUBLICATIONS

GSMA, "eSIM Whitepaper the what and how of Remote SIM Provisioning," Mar. 2018, 21 pages.

* cited by examiner

METHOD AND APPARATUS FOR HANDLING REMOTE PROFILE MANAGEMENT EXCEPTION

CROSS-REFERENCE TO RELATED APPLICATIONS

This application is based on and claims priority under 35 U.S.C. § 119 to Korean Patent Application Nos. 10-2018-0125437 filed on Oct. 19, 2018 and 10-2018-0132539, filed on Oct. 31, 2018, in the Korean Intellectual Property Office, the disclosures of which are herein incorporated by reference in their entireties.

BACKGROUND

1. Field

The disclosure relates to a method and an apparatus capable of remotely managing a profile.

In addition, the disclosure relates to a wireless communication system and, more specifically, to a method and an apparatus for downloading and installing a SIM profile for a communication service to a terminal in a wireless communication system, and then establishing communication connection.

In addition, the disclosure relates to a method and an apparatus for efficiently managing a SIM profile with regard to one or more terminals.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large-scale antenna technologies are being discussed as means to mitigate a propagation path loss in the ultrahigh-frequency band and increase a propagation transmission distance. Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. Internet-of-Everything (IoE) technology, in which big-data processing technology involving a connection with a cloud server or the like is combined with IoT technology, has emerged. In order to implement the IoT, research is being conducted on technical factors such as a sensing technique, wired/wireless communication and network infrastructure, service interface technology, and security technology are required, and thus technologies such as a sensor network, Machine to Machine (M2M), Machine Type Communication (MTC), and the like for a connection between objects. In an IoT environment, an intelligent Internet Technology (IT) service that collects and analyzes data generated from connected objects and creates new value in peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, 5G communication technologies such as sensor network, M2M communication, and MTC are implemented by beamforming, MIMO, and an array antenna scheme. The application of a cloud RAN as the big data processing technology may be an example of convergence of the 5G technology and the IoT technology.

As described above, development of mobile communication systems has made it possible to provide various services, and there is accordingly a demand for a scheme for effectively providing such services.

The above information is presented as background information only to assist with an understanding of the disclosure. No determination has been made, and no assertion is made, as to whether any of the above might be applicable as prior art with regard to the disclosure.

SUMMARY

An embodiment provides an apparatus and a method capable of effectively providing a service in a mobile communication system.

Particularly, an aspect of the disclosure is to provide a method and an apparatus wherein, if a remote management command from a profile server cannot be handled, the remote management command is handled exceptionally.

In addition, another aspect of the disclosure is to provide an apparatus and a method wherein, in a situation in which it is impossible to manipulate the screen of a terminal having an eUICC installed therein in a communication system (for example, if the terminal needs to be managed remotely), an operation for installing a profile in the terminal, enabling the installed profile, disabling the installed SIM profile, or the like can be managed remotely.

In accordance with an aspect of the disclosure, a method of a terminal includes: receiving a request related to a first function from a profile server; identifying if the first function can be executed; identifying if it is possible to switch to a second function if the first function cannot be executed; and handling the request based on the second function if it is possible to switch to the second function.

In accordance with an aspect of the disclosure, a terminal includes: a transceiver; and a controller configured to receive a request related to a first function from a profile server, to identify if the first function can be executed, to identify if it is possible to switch to a second function if the first function cannot be executed, and to handle the request based on the second function if it is possible to switch to the second function.

According to an embodiment, there may be provided a method including: receiving a remote profile management command from a profile server; identifying if the remote profile management command can be handled; additionally identifying if the profile server is a manager profile server; handing the remote profile management command and additionally identifying the result thereof; switching the remote profile management command to a local profile management command, based on the result(s) of identifying, and handing the same; and transmitting, as a reply, the result of handing the remote profile management command and/or the local profile management command to the profile server.

In addition, according to some embodiments, there may be provided a terminal: a transceiver; and a controller configured to receive a remote profile management command from a profile server, to identify if the remote profile management command can be handled, to additionally identify if the profile server is a manager profile server, to handle the remote profile management command and to additionally identify the result thereof, to switch the remote profile management command to a local profile management command, based on the result(s) of identifying, and to handle the same, and to transmit, as a reply, the result of handing the remote profile management command or the local profile management command to the profile server.

The technical subjects pursued in the disclosure may not be limited to the above mentioned technical subjects, and other technical subjects which are not mentioned may be clearly understood, through the following descriptions, by those skilled in the art of the disclosure.

According to various embodiments, a terminal in a communication system may check the right of profile servers that have transmitted a remote management command, based on if an eUICC can handle the remote management command and based on managing SM-DP+ information of installed profiles and the like, and may switch the remote management command to a local management command and execute the same, if the right regarding the remote management command of a profile server cannot be checked because there is no manager profile server information in the profile, or if the eUICC cannot handle the remote management command.

In addition, according to an embodiment, even if a terminal having an eUICC installed therein cannot be controlled, the profile in the terminal can be managed remotely.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 14A-1 illustrates a diagram of another method for installing and enabling a profile according to an embodiment, FIG. 14A-2 illustrates a diagram of another method for installing and enabling a profile according to an embodiment.

DETAILED DESCRIPTION

Figure 1:
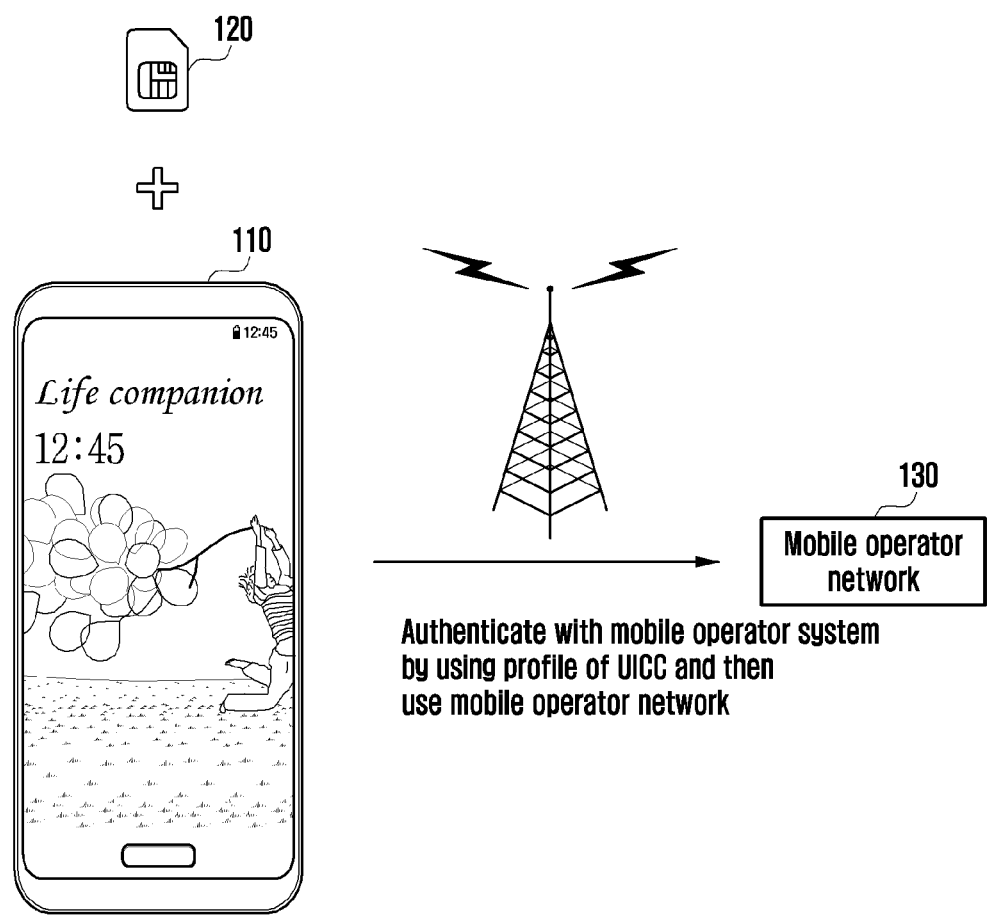
FIG. 1 illustrates a diagram of a method for connecting to a mobile communication network by a terminal according to an embodiment by using a UICC having an embedded profile loaded therein.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments described below, but may be implemented in various different forms. The embodiments are solely provided to make the disclosure complete and to inform a person skilled in the art to which the disclosure pertains of the full scope of the disclosure. The disclosure is only defined by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

The specific terms used herein are provided for ease of understanding the disclosure, and such specific terms may be changed into other forms without departing from the spirit and scope of the disclosure.

A universal integrated circuit card (UICC) is a smart card used while being inserted into a mobile communication terminal or the like, and is also referred to as a UICC card. The UICC may include an access control module for accessing a network of a mobile communication operator. Examples of the access control module include a universal subscriber identity module (USIM), a subscriber identity module (SIM), and an IP multimedia service identity module (ISIM). A UICC including a USIM is also referred to as a USIM card. Likewise, a UICC including a SIM module is also referred to as a SIM card.

In the disclosure, the terms "SIM card", "UICC card", "USIM card", and "UICC including ISIM" may hereinafter be used in the same sense. In addition, the same technical application to the SIM card may be made to the USIM card, the ISIM card, or a normal UICC card.

The SIM card stores personal information of a mobile communication subscriber, authenticates the subscriber when accessing a mobile communication network, and generates a traffic security key, thereby enabling safe mobile communication use.

At the timepoint of proposal of the disclosure, the SIM card is normally manufactured, at the request of a specific mobile communication operator, as a dedicated card for the corresponding operator, and authentication information for accessing the network of the corresponding operator, for example, the USIM application, the international mobile subscriber identity (IMSI), the K value, or the OPc value, is loaded in the card before the card is shipped. Therefore, the manufactured SIM card is delivered to the corresponding mobile communication operator and then provided to the subscriber, and it is also possible to manage (for example, install, modify, or delete) the application inside the UICC by using a technology such as over the air (OTA). The subscriber can insert the UICC card into his/her own mobile communication terminal and thereby use the network of the corresponding mobile communication operator and application services. When replacing terminals, the UICC card can be moved/inserted from the existing terminal into a new one such that the same authentication information, mobile communication telephone numbers, person telephone directory, and the like stored in the UICC card can be in the new terminal.

However, the SIM card inconveniences the mobile communication terminal user when he/she wants to receive a service from another mobile communication operator. That is, the mobile communication terminal user needs to inconveniently acquire the SIM card physically in order to receive a service from the mobile communication operator. For example, when he/she is traveling in another nation, the local SIM needs to be acquired to receive the local mobile communication service, which is inconvenient. A roaming service may remove the inconvenience to some extent, but has a problem in that the service is relatively expensive, and the service is unavailable if there is no contact between the relevant communication operators.

Such inconvenience may be removed to some extent if a SIM module is remotely downloaded and installed in a UICC card. That is, the SIM module of the mobile communication service to be used can be downloaded to the UICC card at a timepoint desired by the user. Multiple SIM modules may be downloaded and installed in the UICC card, and only one SIM module may be selected and used. Such a UICC card may be embedded in the terminal or may not be embedded therein. A UICC used while being embedded in a terminal is referred to as an embedded UICC (eUICC). The eUICC may normally refer to a UICC card which is used while being embedded in a terminal, and which is configured such that a SIM Module can be remotely downloaded and selected.

In the disclosure, any type of UICC card configured such that a SIM module can be remotely downloaded and selected will be referred to as an eUICC as a whole. That is, a UICC card configured such that a SIM module can be remotely downloaded and selected will hereinafter be referred to as an eUICC regardless of whether the same is embedded in a terminal or not. In addition, SIM module information that is downloaded will be generally referred to as an eUICC profile, or more simply as a profile.

Hereinafter, terms used in the disclosure will be described in more detail.

As used herein, "UICC" is a smart card used while being inserted into a mobile communication terminal, and may refer to a chip configured to store personal information of a mobile communication subscriber, such as network access authentication information, telephone directory, and SMS, such that, when accessing a mobile communication network (for example, GSM, WDCMA, or LTE), the subscriber is authenticated, and a traffic security key is generated, thereby enabling safe mobile communication use. Depending on the type of the mobile communication network accessed by the subscriber, the UICC may have a communication application (for example, SIM, USIM, or ISIM) loaded therein. The UICC may also provide an upper-level security function for loading various applications (for example, electronic wallet, ticketing, and electronic passport) therein.

As used herein, "eUICC" refers to a chip-type security module embedded in a terminal, which cannot be inserted into/detached from the terminal (not attachable/detachable type). A profile may be downloaded and installed in the eUICC by using OTA technology. In other words, the eUICC may be a UICC configured such that a profile can be downloaded and installed therein.

In the disclosure, the method for downloading a profile and installing the same in the eUICC by using the OTA technology is also applicable to an attachable/detachable UICC which can be inserted into and detached from a terminal. That is, embodiments are also applicable to a UICC configured such that a profile can be downloaded and installed therein by using the OTA technology. Although the disclosure will be described with reference to an eUICC configured such that a profile can be downloaded and installed therein, the content of the disclosure is not limited to a chip-type security module embedded in a terminal (eUICC), and is also applicable to an attachable/detachable UICC configured such that a profile can be downloaded and installed therein.

The term "UICC" may be used interchangeably with "SIM" in the disclosure, and the term "eUICC" may be used interchangeably with "eSIM".

As used herein, "profile" may refer to an application, a file system, an authentication key, or the like, which is stored in the UICC, and which is packaged in a software type.

As used herein, "USIM profile" may be used in the same sense as the profile, or may refer to information which is included in a USIM application inside the profile, and which is packaged in a software type.

As used herein, a terminal's operation of enabling a profile may refer to an operation of changing the state of the profile to "enabled" and thereby configuring the terminal to be able to receive a communication service through the communication operator who has provided the profile. A profile in the enabled state may be described as an "enabled profile".

As used herein, a terminal's operation of disabling a profile may refer to an operation of changing the state of the profile to "disabled" and thereby configuring the terminal to be unable to receive the communication service through the communication operator who has provided the profile. A profile in the disabled state may be described as an "disabled profile".

As used herein, a terminal's operation of deleting a profile may refer to an operation of changing the state of the corresponding profile to "deleted" and thereby configuring the terminal to be unable to enable or disable the profile any longer. A profile in the deleted state may be described as an "deleted profile".

As used herein, a terminal's operation of enabling, disabling, or deleting a profile may have the following meaning: instead of instantly changing the state of each profile to "enabled", "disabled", or "deleted", the terminal may first make a marking of "to be enabled", "to be disabled", or "to be deleted" with regard go each profile, and after performing a specific operation (for example, performing a "refresh" or "reset" command), the terminal or the UICC of the terminal may change each profile to "enabled", "disabled", or "deleted". The operation of making a marking of a scheduled state (for example, "to be enabled", "to be disabled", or "to be deleted") regarding a specific profile is not necessarily limited to marking one scheduled state with regard to one profile, and it is also possible to mark one or more profiles with identical or different scheduled states, to mark one profile with one or more scheduled states, or to mark one or more profiles with identical or different one or more scheduled states.

In addition, when a terminal marks a specific profile with one or more scheduled states, the two marks may be integrated into one. For example, if a specific profile is marked with 'to be disabled" and "to be deleted", the profile may be integrally marked with "to be disabled and deleted".

In addition, a terminal's operation of marking one or more profiles with a scheduled state may be performed successively or simultaneously. In addition, a terminal's operation of marking one or more profiles with a scheduled state and then changing the actual state of the profiles may be performed successively or simultaneously.

In the disclosure, a profile provisioning server may include the function of generating a profile, encrypting the generated profile, generating a remote profile management instruction, or encrypting the generated remote profile management instruction. The profile provisioning server may be expressed as at least one of a subscription manager data preparation (SM-DP), a subscription manager data preparation plus (SM-DP+), a manager profile server, a managing subscription manager data preparation plus (managing SM-DP+), an off-card entity of profile domain, a profile encryption server, a profile generating server, a profile provisioner (PP), a profile provider, and a profile provisioning credentials holder (PPC holder).

In the disclosure, a profile management server may be expressed as at least one of a subscription manager secure routing (SM-SR), a subscription manager secure routing plus (SM-SR+), an off-card entity of eUICC profile manager, a profile management credentials holder (PMC holder), or an eUICC manager (EM).

A profile provisioning server, as used herein, may also incorporate the function of a profile management server. Accordingly, the operation of a profile provisioning server in various embodiments described below may also be performed by a profile management server. Likewise, an operation described with regard to a profile management server or SM-SR may also be performed by a profile provisioning server. In addition, a profile provisioning server or a profile management server, as used herein, may be expressed as a profile server. A profile server may be one of the profile provisioning server or the profile management server, or may be a device including both the profile provisioning server and the profile management server. In addition, the profile provisioning server and the profile management server may be referred to as a first profile server and a second profile server, respectively.

As used herein, an opening/mediation server may be expressed as at least one of a subscription manager discovery service (SM-DS), a discovery service (DS), a root SM-DS, or an alternative SM-DS. The opening/mediation server may receive a register event request or an event register request from one or more profile provisioning servers or opening/mediation servers. In addition, one or more opening/medication servers may be used in combination, and the first opening/mediation server in this case may receive an event register request not only from the profile provisioning server, but also from the second opening/mediation server. A profile server may further include one or more opening/mediation servers.

As used herein, a profile provisioning server and an opening/mediation server may be commonly referred to as a remote SIM provisioning (RSP) server. The RSP server may be expressed as a subscription manager XX (SM-XX).

The term "terminal" as used herein may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a moving node, a mobile, or other terms.

Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include, but is not limited to a machine to machine (M2M) terminal and a machine type communication (MTC) terminal/device. In the disclosure, a terminal may also be referred to as an electronic device.

In the disclosure, an electronic device may have a UICC embedded therein such that a profile can be downloaded and installed therein. When the electronic device has no embedded UICC, a UICC physically separated from the electronic device may be inserted into the electronic device and connected thereto. For example, the UICC may be inserted into the electronic device in a card type. The electronic device may include a terminal, and the terminal may include a UICC configured such that a profile can be downloaded and installed therein. Not only can the UICC be inserted into the terminal, but the UICC, when separated from the terminal, may be inserted therein, and may be inserted and connected to the terminal. A UICC configured such that a profile can be downloaded and installed therein may be referred to as an eUICC, for example.

In the disclosure, a terminal or an electronic device may include software or an application installed in the terminal or the electronic device so as to control the UICC or the eUICC. The software or application installed in the terminal or the electronic device so as to control the UICC or the eUICC may be referred to as a local profile assistant (LPA), for example.

As used herein, "profile identifier" may be referred to as a profile ID, an integrated circuit card ID (ICCID), a matching ID, an event ID, an activation code, an activation code token, a command code, a command code token, or a factor matching with an ISD-P or a profile domain (PD). The profile ID may indicate the unique ID of each profile. The profile identifier may include the address of a profile provisioning server (SM-DP+) capable of indexing the profile.

In the disclosure, an eUICC ID may be a unique ID embedded in a terminal, and may be referred to as an EID. In addition, if the eUICC has a provisioning profile preloaded therein, the eUICC ID may be the profile ID of the provisioning profile. In addition, if the terminal and the eUICC chip are not separated as in an embodiment, the eUICC ID may be the terminal ID. In addition, the eUICC ID may refer to a specific secure domain of the eUICC chip.

In the disclosure, "profile container" may be referred to as a profile domain. The profile container may be a security domain.

In the disclosure, an application protocol data unit (APDU) may be a message used by a terminal to interwork with an eUICC. In addition, the APDU may be a message used by a PP or a profile manager (PM) to interwork with an eUICC.

In the disclosure, profile provisioning credentials (PPC) may be a means used for mutual authentication, profile encryption, and signing between a profile provisioning server and an eUICC. The PPC may include at least one of a symmetric key, a Rivest-Shamir-Adleman (RSA) certificate and a personal key, an elliptic curved cryptography (ECC) certificate and a person key, a root certification authority (root CA), and a certificate chain. In addition, if there are multiple profile provisioning servers, different PPCs may be stored or used in the eUICC with regard to the multiple profile provisioning servers.

In the disclosure, profile management credentials (PMC) may be a means used for mutual authentication, transmission data encryption, and signing between a profile management server and an eUICC. The PMC may include at least one of a symmetric key, a RSA certificate and a personal key, an ECC certificate and a person key, a root CA, and a certificate chain. In addition, if there are multiple profile management servers, different PMCs may be stored or used in the eUICC with regard to the multiple profile management servers.

In the disclosure, an ADI may be an application identifier. This value may be an identifier for identifying different applications inside an eUICC.

In the disclosure, the term "event" may be used to denote profile download, remote profile management, or other instructions for managing/handing a profile or an eUICC in a comprehensive manner. An event may be referred to as a remote SIM provisioning operation (or RSP operation) or an event record. Each event may be referred to as data including at least one of an event identifier (event ID or eventID) corresponding thereto, a matching identifier (matching ID or matchingID), or the address (FQDN, IP address, or URL) of a profile provisioning server (SM-DP+) or opening/mediation server (SM-DS) in which the event is stored. Profile download may be used interchangeably with profile installation. In addition, the term "event type" may be used to indicate whether a specific event is profile download, remote profile management (for example, deleting, enabling, disabling, replacing, or updating), or another command for managing/handing a profile or an eUICC. An event type may be referred to as an operation type (or operationtype), an operation class (or operationclass), an event request type, an event class, or an event request class.

In the disclosure, the term "profile package" may be used interchangeably with a profile or used to denote the data object of a specific profile, and may be referred to as a profile TLV or a profile package TLV. If a profile package is encrypted by using an encryption parameter, the same may be referred to as a protected profile package (PPP) or a protected profile package TLV (PPP TLV). When a profile package is encrypted by using an encryption parameter that can be decrypted only by a specific eUICC, the same may be referred to as a bound profile package (BPP) or a bound profile package TLV (BPP TLV). A profile package TLV may be a data set expressing information constituting the profile in a tag/length/value (TLV) format.

As used herein, "local profile management (LPM)" may be referred to as profile local management, local management, local management command, local command, LPM package, profile local management package, local management package, local management command package, or local command package. The LPM may be used in order to change the state of a specific profile (enabled, disabled, or deleted) through software or the like installed in a terminal, or to update the content of a specific profile (for example, the profile nickname of the profile metadata). The LPM may include one or more local management commands, and the profile that is the target of each local management command in this case may be identical or different with regard to each local management command.

As used herein, "remote profile management (RPM)" may be referred to as profile remote management, remote management, remote management command, remote command, RPM package, profile remote management package, remote management package, remote management command package, or remote command package. The RPM may be used in order to change the state of a specific profile (enabled, disabled, or deleted) or to update the content of a specific profile (for example, the profile nickname or the profile metadata). The RPM may include one or more remote management commands, and the profile that is the target of each remote management command in this case may be identical or different with regard to each remote management command.

As used herein, the term "target profile" may denote a profile that is the target of a local management command or a remote management command.

As used herein, "certificate" or "digital certificate" may refer to a digital certificate used for mutual authentication based on an asymmetric key including a pair of a public key (PK) and a secret key (SK). Each certificate may include one public key or more than one public keys, a public key identifier (PKID) corresponding to each public key, the ID of the certificate issuer (CI) who issued the corresponding certificate (certificate issuer ID), and a digital signature.

In addition, the certificate issuer may be referred to as a certification issuer, a certificate authority (CA), or a certification authority.

In the disclosure, "public key" and "public key identifier" may be used interchangeably with a specific public key or a certificate including the public key; or a part of a specific public key or a part of a certificate including the public key; or an operation result (for example, hash value) of a specific public key or an operation result (for example, has value) of a certificate including the public key; or an operation result (for example, hash value) of a part of a specific public key or an operation result (for example, hash value) of a part of a certificate including the public key; or a storage in which data is stored.

In the disclosure, if certificates issued by a certificate issuer (primary certificates) are used to issue another certificate (secondary certificate), or if secondary certificates are used to issue tertiary or higher-order certificates in an interlinked manner, the correlation between the certificates may be referred to as a certificate chain or a certificate hierarchy. The CI certificate used to issue the initial certificate may be referred to as a root of certificate, the topmost certificate, a root CI, a root CI certificate, a root CA, or a root CA certificate.

As used herein, "mobile operator" may refer to a business corporation for providing terminals with a communication service, and may be used in a comprehensive manner to denote the business supporting system (BSS) of the mobile operator, the operational supporting system (OSS), the point of sale (POS) terminals, and other IT systems. In addition, the mobile operator as used herein is not limited to a specific business corporation for providing a communication service, but may be used to denote a group or association (or consortium) of one or more business corporations, or the representative of the group or association. In addition, the mobile operator may also be referred to as an operator (OP or Op.), a mobile network operator (MNO), a service provider (SP), or a profile owner (PO), and each mobile operator may have at least one name and/or object identifier (OI) configured or assigned thereto. If a mobile operator refers to a group, an association, or a representative of one or more business corporations, the name or OID of a specific group, association, or representative may be the name or OID shared by all business corporations belonging to the group or association, or of all businesses cooperating with the corresponding representative.

In the disclosure, "version" may refer to the version of a specification or a protocol supported by a specific entity, and may also be expressed as a specification version number (SVN) or the like. For example, "LPA version (or LPA SVN)" may be used as a term referring to the version of a protocol supported by the LPA inside a terminal. For example, an eUICC version (or eUICC SVN) may be used as a term referring to the version of a protocol supported by a eUICC inside a terminal. For example, a device version (or device SVN) may be used as a term referring to at least one value of the version of a protocol supported by an LPA inside a terminal and the version of a protocol supported by an eUICC. For example, a server version (or server SVN) may be used as a term referring to the version of a protocol supported by the corresponding server. For example, a profile version (or profile SVN) may be used as a term referring to the version of a protocol supported by the corresponding profile.

In the disclosure, a version may be expressed as a combination of at least one selected from at least one number indicating the corresponding version, a delimiter that delimits each number, and a prefix indicating that the corresponding number describes a version. For example, if three numbers are used to described the major, minor, and revision of a version, respectively, the version of a specific entity may be expressed such as "v3.0.0" by using delimiter "." And prefix "v", or as "3.0.0" with the prefix omitted. If necessary, number "0" may be additionally omitted, and the version of a specific entity may be indicated solely by the major version. It is to be noted that the above example of version description using three numbers, a specific delimiter, and a prefix can be identically expanded and applied to other cases using more numbers or other delimiters and prefixes.

As used herein, the expression regarding two versions "the second version precedes the first version" may be interpreted in the sense that the number describing the first version is larger than the number describing the second version, or that part or all of the function supported by the first version protocol is not supported by the second version protocol.

In the disclosure, "AKA" may refer to authentication and key agreement, and may indicate an authentication algorithm for accessing 3GPP and 3GPP2 networks.

In the disclosure, "K" (of K value) may refer to an encryption key stored in an eUICC used for the AKA authentication algorithm.

In the disclosure, "OPc" may be a parameter value that can be stored in an eUICC used for the AKA authentication algorithm.

In the disclosure, "NAA" may refer to a network access application program, such as USIM or ISIM, stored in a UICC so as to access a network. The NAA may be a network access module.

Furthermore, in the following description of the disclosure, a detailed description of known functions or configurations incorporated herein will be omitted when it may make the subject matter of the disclosure rather unclear.

Hereinafter, various embodiments regarding a method and an apparatus for generating and managing a list of mobile operators capable of remotely managing a profile, a method and an apparatus for downloading a communication service to a terminal in a communication service, installing the same, and connecting communication, and a method and an apparatus for downloading and installing a profile online in a communication system, will be described.

FIG. 1 illustrates a diagram of a method for connecting to a mobile communication network by a terminal according to an embodiment by using a UICC having an embedded profile loaded in the terminal.

As illustrated in FIG. 1, the UICC 120 may be inserted into the terminal 110. For example, the UICC 120 may be of an attachable/detachable type, or may be embedded in the terminal 110 in advance.

The embedded profile of the UICC having the embedded profile loaded therein means that "access information" is embedded therein, which can be used to access a specific mobile operator. For example, the access information may be a subscriber identifier (IMSI) and a K or Ki value necessary to authenticate a network together with the subscriber identifier.

The terminal 110 may use the UICC 120 so as to perform authentication with an authentication handling system of the mobile operator (for example, home location register (HLR) or AuC). For example, the authentication process may be an AKA processor. After succeeding in the authentication, the terminal 110 may use a mobile communication service (for example, making a telephone call or using mobile data) by using the mobile communication network 130 of the mobile communication system.

Figure 2:
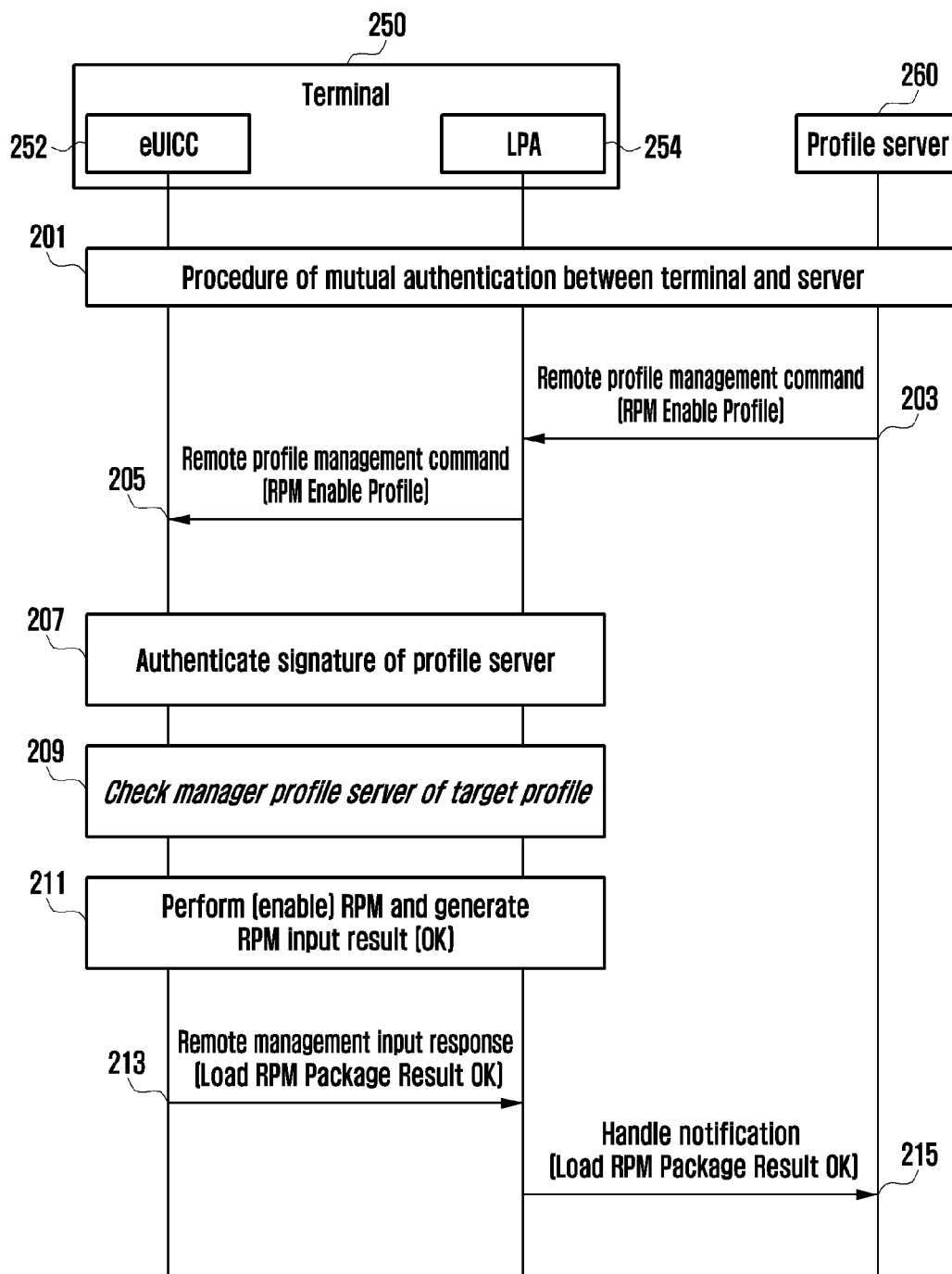
FIG. 2 illustrates a diagram of an example of a normal procedure in which a terminal according to an embodiment receives a remote management command from a profile server and handles the same.

FIG. 2 illustrates a diagram of an example of a normal procedure in which a terminal according to an embodiment receives a remote management command from a profile server and handles the same.

In FIG. 2, the terminal 250 may have an eUICC 252 mounted therein and may have an LPA installed therein so as to control the eUICC 252. In addition, the terminal 250 or the eUICC 252 may have one or more profiles installed therein. In addition, each installed profile may have a description of one or more profile servers capable of remotely controlling the profile. Although it will be assumed in the following description that the profile server is, for example, a manager profile server (managing SM-DP+) or SM-DP+, the profile server of the disclosure is not limited thereto.

The list of described manager profile servers may include the address of each manager profile server (in the type of an IP address or FQDN) or the object identifier thereof. Although not illustrated in the diagram, a remote profile management command generated at the request of the mobile operator may stand by in the profile server 260.

Referring to FIG. 2, in step 201, the terminal 250 and the profile server 260 may perform mutual authentication. Step 201 may include TLS connection based on server authentication. In addition, step 201 may further include one or more steps of transmitting and receiving, for example, at least an initiate authentication request message, an initiate authentication response message, and an authenticate client request message. In addition, step 201 may be a procedure integrated with part or all of step 203.

In step 203, the profile server 260 may transmit a remote profile management command to the LPA 254. In step 203, the profile server 260 may use, for example, at least one remote management command and a terminal authentication response (authenticate client response) message including the digital signature of the profile server 260. The digital signature of the profile server 260 may be calculated based on at least one remote management command.

It is to be noted that, although the diagram illustrates an example of only one "enable profile" remote management command transmitted in step 203, more than one remote management commands may be transmitted as described above, and various kinds or remote management commands may be transmitted, such as "disable profile" and "delete profile", in addition to the "enable profile" remote management command.

In step 205, the LPA 254 may deliver the remote profile management command to the eUICC 252. In step 205, the LPA 254 may use, for example, at least one remote management command and a remote management input request (load RPM package request) message including the digital signature of the profile server 260. The remote management input request message may include part or all of the terminal authentication response message in step 203.

In step 207, the eUICC 252 may authenticate the digital signature of the profile server 260 received in step 205. Authentication of the digital signature may be calculated based on the at least one remote management command received in step 205. After successfully authenticating the digital signature, the eUICC 252 may perform step 209.

In step 209, the eUICC 252 may identify, with regard to the one or more remote management commands received in step 205, if the profile server 260 that transmitted the remote management commands is described as the manager profile server of the target profile of each remote management command. That is, remote management commands may be targeted at different profiles installed in the eUICC, and the target profile of the corresponding remote management command may be identified based on the profile ID (or ICCID) inside the remote management command. With regard to the target profile of a remote management command transmitted by a profile server 260 described as a manager profile server, the eUICC 252 may perform step 211.

In step 211, the eUICC 252 may perform the one or more remote management commands received in step 205. If one or more remote management commands are received, the eUICC 252 may repeatedly perform respective remote management commands. After performing respective remote management commands, the eUICC 252 may generate a remote management input result (load RPM package result).

The remote management input result regarding one or more remote management commands received by the eUICC 252 may include, if each remote management is successful, "OK" in the type of at least one character string or a number string corresponding thereto and, if each remote management has failed, an error code indicating the cause of failure in the type of at least one character string or a number string corresponding thereto.

The diagram illustrates a case in which the remote management command received in step 205 is "enable profile", and the eUICC 252 has successfully enabled the target profile and thus has generated the result "OK" in step 211.

In step 213, the eUICC 252 may send the remote management input result, as a reply, to the LPA 254. In step 213, the eUICC 252 may use a remote management input response (load RPM package response) message including at least the remote management input result.

In step 215, the LPA 254 may deliver the remote management input result (load RPM package result) to the profile server 260. In step 215, the LPA 254 may use, for example, a handle notification message. The handle notification message may include part or all of the remote management input response message in step 213.

Referring to FIG. 2, if the profile server 260 is described as a management profile server in a specific profile installed in the terminal 250 or the eUICC 252, the profile server 260 may transmit a remote management command to the terminal 250 so as to remotely control the target profile.

Figure 3:
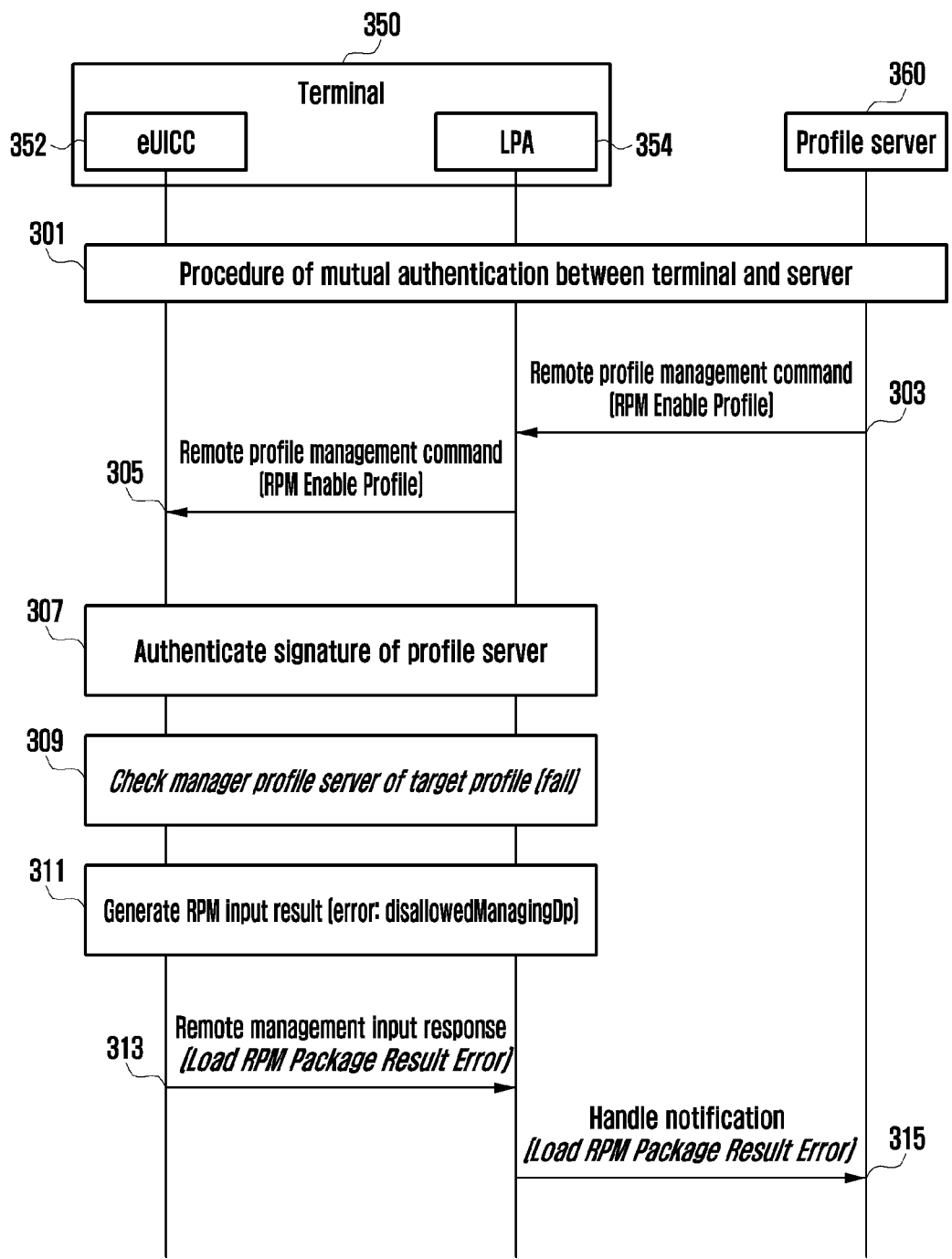
FIG. 3 illustrates a diagram of an example of a normal procedure in which a terminal according to an embodiment has received a remote management command from a profile server but fails in the remote management because the profile server is not described as the manager profile server (managing SM-DM+) of the target profile.

FIG. 3 illustrates a diagram of an example of a normal procedure in which a terminal according to an embodiment has received a remote management command from a profile server but fails in the remote management because the profile server is not described as a manager profile server (managing SM-DM+) of the target profile.

In FIG. 3, descriptions of the terminal 350 and the profile server 360 are identical to those made with reference to FIG. 2, and thus will not be repeated herein. In addition, descriptions of step 301 to step 307 are identical to those of step 201 to step 207 in FIG. 2, and thus will not be repeated herein.

In step 309, the eUICC 352 may identify, with regard to one or more remote management commands received in step 305, if the profile server 360 that transmitted the remote management commands is described as the manager profile server of the target profile of each remote management command. With regard to the target profile of a remote management command transmitted by a profile server 360 not described as a manager profile server, the eUICC 352 may perform step 311.

In step 311, the eUICC 352 may generate a remote management input result (load RPM package result). The remote management input result regarding one or more remote management commands received by the eUICC 352 may include, if each remote management is successful, "OK" in the type of at least one character string or a number string corresponding thereto and, if each remote management has failed, an error code indicating the cause of failure in the type of at least one character string or a number string corresponding thereto.

The diagram illustrates a case in which the remote management command received in step 305 is "enable profile", and the eUICC 352 has failed to authenticate the manager profile server and thus generates an error code "disallowed managing SM-DP+(or disallowedManagingDp)" as the result in step 309.

Descriptions of step 313 to step 315 are identical to those of step 213 to step 215 in FIG. 2, and thus will not be repeated herein. Referring to FIG. 3, by using the manager profile server list of the profile installed in the terminal 350 or the eUICC 352, the terminal 350 may distinguish between a profile server having a right to remotely manage the corresponding profile and a profile server having no right, and may block remote management by the profile server having no right, thereby safely protecting the profile. However, there is a drawback in that, in the case of a profile which is installed by a profile server not supporting the remote profile management function, and which thus has no manager profile server list configured therein, remote profile management cannot be supported until the manager profile server list is generated through a profile update.

Figure 4A:
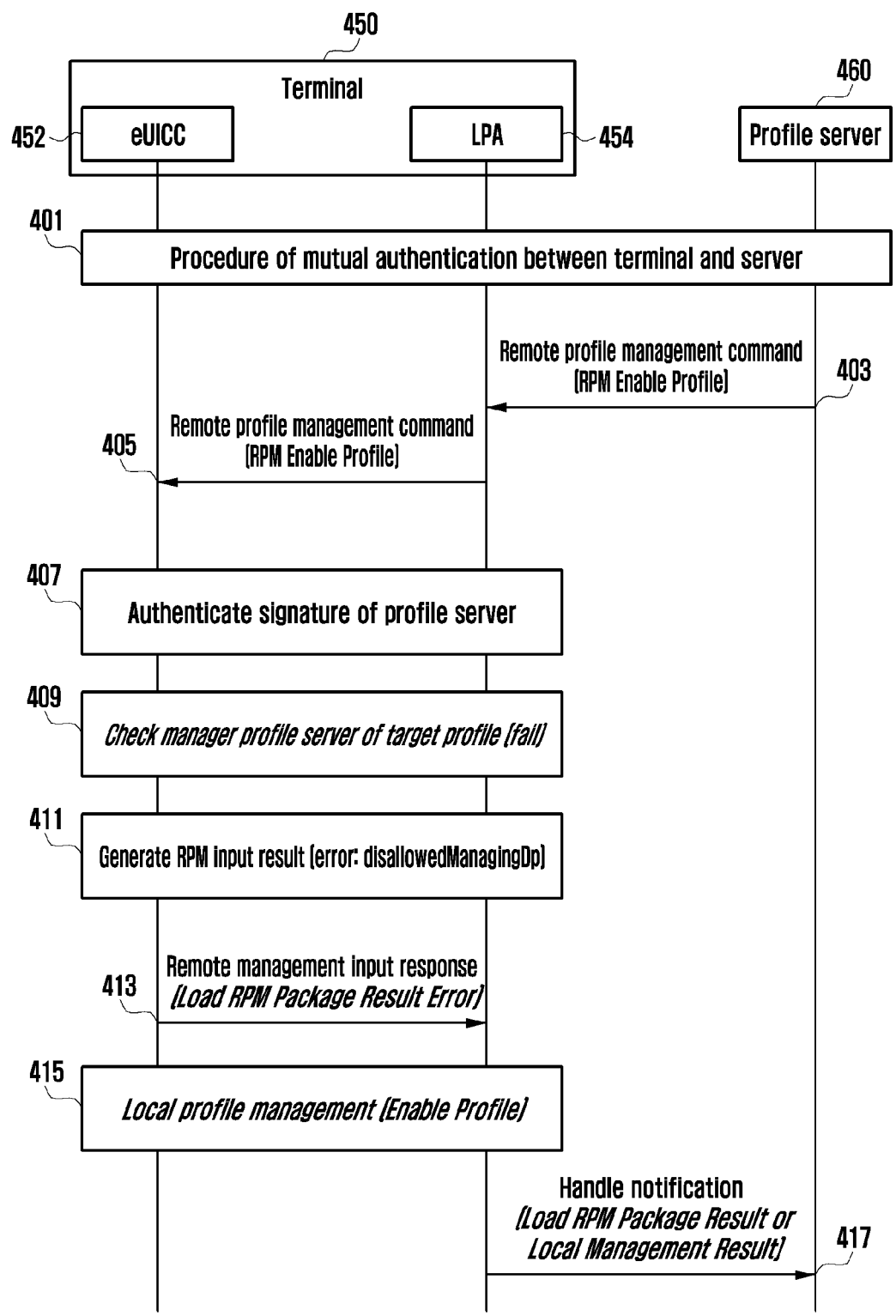
FIG. 4A illustrates a diagram of an example of a terminal operation procedure in which a terminal according to an embodiment has received a remote management command from a profile server but switches the remote management command to a local management command because the profile server is not described as a manager profile server of the target profile.

FIG. 4A illustrates a diagram of an example of a terminal operation procedure in which a terminal according to an embodiment has received a remote management command from a profile server but switches the remote management command to a local management command because the profile server is not described as a manager profile server of the target profile.

In FIG. 4A, the terminal 450 may have an eUICC 452 mounted therein and may have an LPA 454 installed therein so as to control the eUICC 452. In addition, the terminal 450 or the eUICC 452 may have one or more profiles installed therein. In addition, each installed profile may have a description of one or more manager profile servers capable of remotely controlling the profile, or may have no description thereof. The case in which there is no description of the manager profile server may include a case in which a data object expressing a manager profile server list exists, but there is no entry thereof, and a case in which no data object expressing a manager profile server list exists. In the disclosure, the former case will be referred to as "empty list", and the latter case will be referred to as "null list" for convenience of description. The LPA 454 may distinguish between the empty list and the null list when handling the operation of the terminal 450.

Descriptions of step 401 to step 407 in FIG. 4 are identical to those of step 201 to step 207 in FIG. 2, and thus will not be repeated herein. In addition, descriptions of step 409 to step 413 in FIG. 4 are identical to those of step 309 to step 313 in FIG. 3, and thus will not be repeated herein.

In step 415, the LPA 454 may check the remote management input result (load RPM package result) sent by the eUICC 452 as a reply. If the remote management input result includes an error code "disallowed managing SM-DP+ or disallowedManagingDp)", the LPA 454 may check the manager profile server list of the target profile in order to determine the cause of the error code.

In order to check the manager profile server list, a "get profile info" command among local management commands may be used as an operation for retrieving profile metadata of the target profile. If the profile metadata of the target profile has been previously retrieved by using the same command and then cached in a temporary memory, the information in the temporary memory may be utilized. According to the result of checking the manager profile server list of the target profile, the LPA 454 may operate as follows:

(A) if one or more profile servers are already described in the manager profile server list The LPA 454 may identify, with regard to the target profile, that an error code "disallowed managing SM-DP+ (or disallowedManagingDp)" has been generated because the profile server 460 has no remote management right. In this case, the LPA 454 may deliver the remote management input result (load RPM package result), which is a reply from the eUICC 452, to the profile server 460 in step 417 without performing an additional operation.

(B) if the manager profile server list is a null list

The LPA 454 may identify that an error code "disallowed managing SM-DP+(or disallowedManagingDp)" has been generated because the target profile does not support remote profile management (for example, a profile having no manager profile server list for remote profile management configured therein). In this case, the LPA 454 may selectively perform additional authentication regarding if the profile server 460 is genuine. The additional authentication may be performed as in the following list of methods (not illustrated in the drawings), but is not necessarily limited to the following list:

no separate additional authentication
additional authentication data (token, signature, digital certificate, bitmap, flag, or the like) is received from the profile server in step 403, and the LPA 454 or the eUICC 452 conducts authentication
a separate message other than a terminal authentication response is used in step 403
by comparing the manager profile server list of the target profile with the address (IP address of FQDN) of a profile server separately stored in the LPA 454 or the eUICC 452, or with a list of object identifiers, the LPA 454 or the eUICC 452 authenticates if the profile server 460 is included in the corresponding list
the LPA 454 or the eUICC 452 requests the profile server 460 to provide additional authentication data (token, signature, digital certificate, bitmap, flag, or the like), and the LPA 454 or the eUICC 452 authenticates data received from the profile server 460 as a reply If additional authentication is successful, the LPA 454 may determine that the profile server 460 has a remote management right although the target profile does not support remote profile management, may switch the remote management command to an equivalent local management command, which does not require manager profile server authentication, and may handle the same. In addition, the handling result data may be generated.

For example, commands "RPM enable profile", "RPM disable profile", "RPM delete profile", and "RPM list profile info" may be switched to commands "local enable profile", "local disable profile", "local delete profile", and "local get profiles info", respectively, and then performed.

(C) if the manager profile server list is an empty list, the LPA 454 may perform operation (A) or perform operation (B).

Description of step 417 is identical to that of step 415 and that of step 215 in FIG. 2, and thus will not be repeated herein.

In step 417, the LPA 454 may deliver the remote management input result and/or local management input result (local management result) to the profile server 460.

If the LPA 454 has switched the remote management command to an equivalent local management command and then handled the same, the LPA 454 may switch the local management input result to an equivalent remote management input result and then deliver the same. In step 417, the LPA 454 may use a handle notification message, for example. The handle notification message may include part or all of the remote management input result and/or the local management input result.

Referring to FIG. 4, the terminal 450 may replace a remote management command delivered with regard to a profile that does not support remote profile management (that is, profile having no manager profile server list configured therein) with an equivalent local management command (which does not need to be compared with a manager profile server list) and then perform the same, thereby supporting remote management of the corresponding profile. In addition, the terminal 450 may additionally authenticate a profile server attempting remote management with regard to a profile having no manager profile server list configured therein such that an authorized profile server is controlled separately from an unauthorized profile server, thereby safely protecting the profile.

Meanwhile, it is to be noted that, although FIG. 4 illustrates a case in which the remote management command is an enable command, the disclosure is not limited to the corresponding remote management command, and is identically applicable to various remote management commands such as disable, delete, and update.

It is also to be noted that, although not illustrated in FIG. 4, the LPA 454 may perform step 415 after step 403, if necessary. For example, if the LPA 454 has already recognized that the manager profile server list of the target profile is an empty list or a null list, the LPA 454 may instantly switch the remote management command included in step 403 to a local management command and perform the same, without exchanging an additional message with the eUICC 452. This will be described later in more detail.

As another example, if the LPA 454 has already recognized through previously handing of a remote management command that the target profile does not support the remote management command, the LPA 454 may instantly switch the remote management command included in step 403 to a local management command and perform the same, without exchanging an additional message with the eUICC 452. In such an example, step 405 to step 413 may be omitted.

An embodiment of such an operation will be described with reference to FIG. 4B.

In addition, it is to be noted that, although not illustrated in the drawings, the error code that causes the LPA 454 to replace remote management with local management is not necessarily limited to the error code "disallowed managing SM-DP+(or disallowedManagingDp)", and may be expanded to other error codes.

For example, the LPA 454 may selectively perform additional authentication of the profile server 460 as in step 415 with regard to an error code "profile owner mismatch (or profileOwnerMismatch)" in response to a remote management command "profile owner check", may replace remote management that requires profile owner check with local management that requires no profile owner check with regard to an authenticated profile server only, and may perform the same.

Figure 4B:
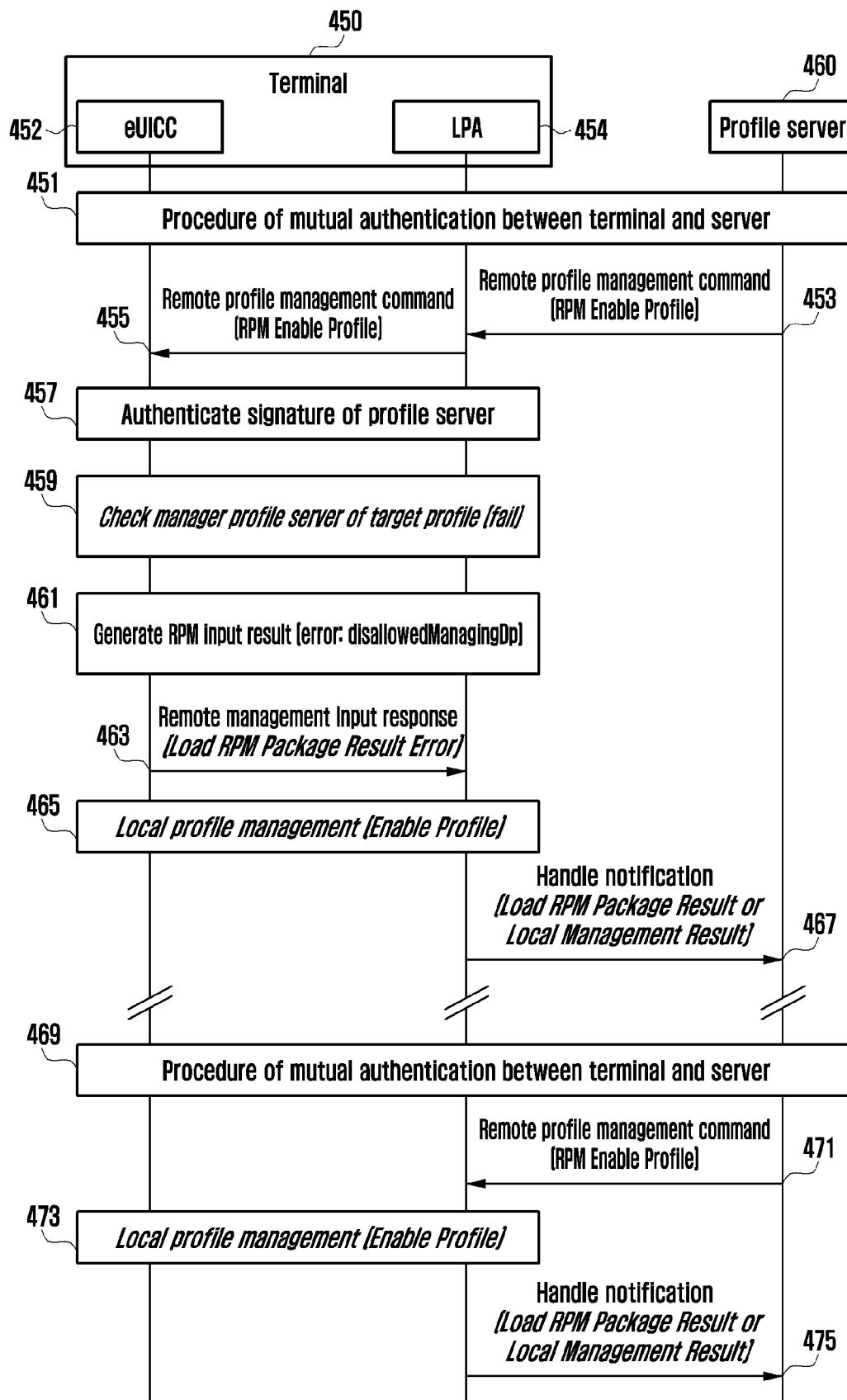
FIG. 4B illustrates a diagram of an example of a terminal operation procedure in which a terminal according to an embodiment has received a remote management command from a profile server but performs a continuous operation of switching the remote management command to a local management command because the profile server is not described as the manager profile server of the target profile.

FIG. 4B illustrates a diagram of an example of a terminal operation procedure in which a terminal 450 according to an embodiment has received a remote management command from a profile server 460 but performs a continuous operation of switching the remote management command to a local management command because the profile server is not described as the manager profile server of the target profile.

In FIG. 4B, descriptions of the terminal 450 and the profile server 460 are identical to those made with reference to FIG. 4A and thus will not be repeated herein. In addition, descriptions of step 451 to step 467 in FIG. 4B are identical to those of step 401 to step 417 in FIG. 4A, and thus will not be repeated herein. In addition, descriptions of step 469 and step 471 in FIG. 4B are identical to those of step 401 to step 403 in FIG. 4A, and thus will not be repeated herein.

Since the LPA 454 has already recognized by performing steps 455 to 465 that the target profile does not support remote management, the LPF 454 may not deliver a remote management command to the eUICC 452 in step 473, and may operate as in step 415 in FIG. 4. That is, the LPA 454 may perform local profile management without delivering a remote management command to the eUICC 452.

Description of step 475 is identical to that of step 417 in FIG. 4, and thus will not be repeated herein.

Referring to FIG. 4B, if the terminal 450 receives a remote management command regarding a target profile which has already been recognized as not supporting remote profile management (that is, profile having no manager profile server list configured therein), the terminal 450 may not unnecessarily deliver a remote management command regarding remote management to the eUICC 452, may instantly replace the delivered remote management command with an equivalent local management command (which does not need manager profile server list comparison), and may perform the same, thereby reducing unnecessary operations of the eUICC 452 and the LPA 454.

Figure 5:
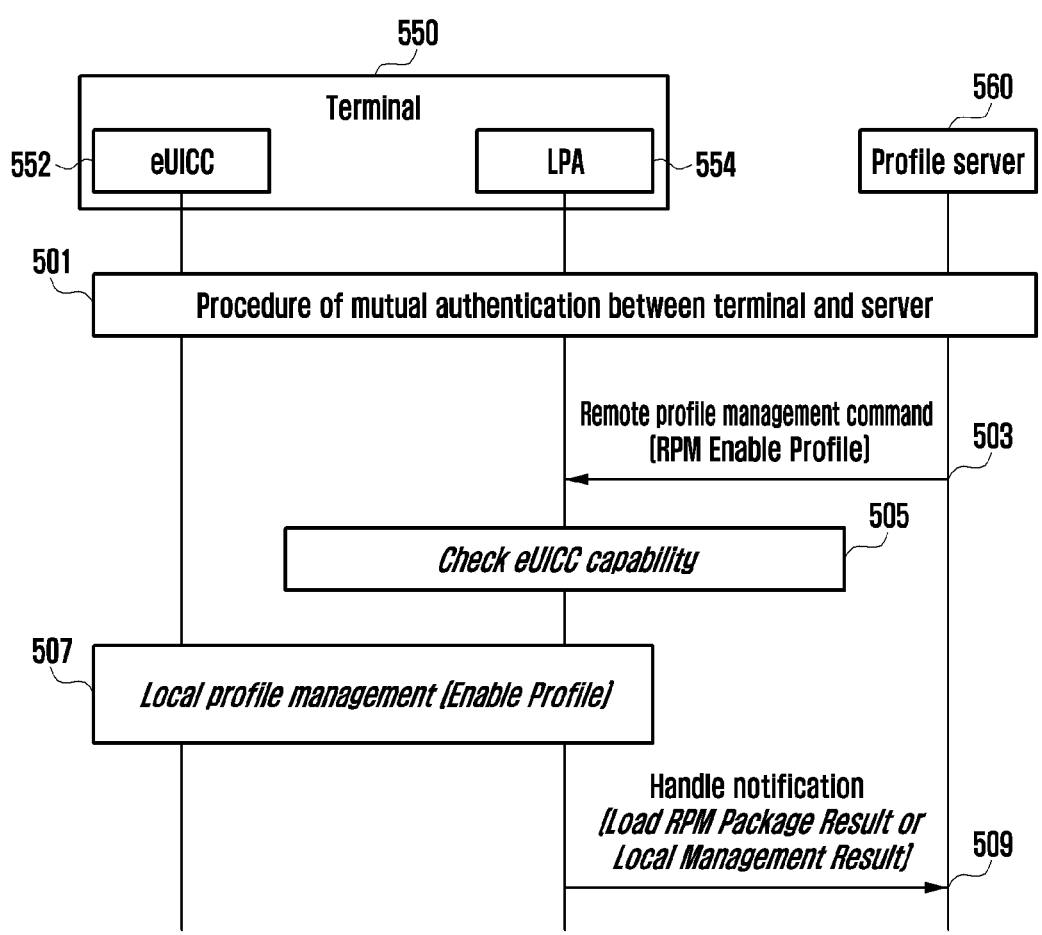
FIG. 5 illustrates a diagram of an example of a terminal operation procedure in which a terminal according to an embodiment has received a remote management command from a profile server but switches the remote management command to a local management command because the eUICC does not support remote profile management.

FIG. 5 illustrates a diagram of an example of a terminal operation procedure in which a terminal 550 according to an embodiment has received a remote management command from a profile server 560, but the LPA 554 switches the remote management command to a local management command because the eUICC 552 does not support remote profile management.

In FIG. 5, the terminal 550 may have an eUICC 552 mounted therein and may have an LPA 554 installed therein so as to control the eUICC 552. In addition, the terminal 550 or the eUICC 552 may have one or more profiles installed therein. In addition, each installed profile may have a description of one or more profile servers capable of remotely controlling the profile, or may have no description thereof. In addition, the eUICC 552 may have no remote management command handling function implemented therein such that the same cannot perform a remote management command.

Descriptions of step 501 and step 503 in FIG. 5 are identical to those of step 201 and step 203 in FIG. 2, and thus will not be repeated herein.

In step 505, the LPA 554 may check the capability of the eUICC 552. More specifically, the LPA 554 may identify if the eUICC 252 can handle a remote management command. Step 505 may be performed in the following exemplary methods, but is not necessarily limited thereto, and step 505 may be omitted if the terminal 550 has already recognized the capability of the eUICC 552.

the specification version number of the eUICC may be checked so as to identify that, if the specification version number is equal to a predetermined specification version number (for example, v3.0.0), is higher than the same, or is absent, the remote management command can be handled. It may be identified that, if the specification version number of the eUICC is lower than the predetermined specification version number (v3.0.0), the remote management command cannot be handled.

the eUICC RSP capability (or euiccRspCapability) may be checked so as to identify that, if RPM support (or rpmSupport) is described in the eUICC RSP capability, the remote management command can be handled. It may be identified that, if there is no eUICC RSP capability, or if RPM support is not described in the eUICC RSP capability, the remote management command cannot be handled.

In addition, it is possible to determine if the eUICC 552 can handle the remote management command through the process described with reference to FIG. 4A and FIG. 4B. If such an process has been performed in advance, information regarding if the eUICC 552 can handle the remote management command may be stored, and the LPA may check the same in step 505. Alternatively, step 505 may be omitted if the eUICC capability has been recognized through the above process.

If it is determined in step 505 that the eUICC 552 cannot handle the remote management command, the LPA 554 may selectively authenticate additionally the profile server 260 in step 507, may switch the remote management command to an equivalent local management command, and may handle the same. In addition, the handing result data may be generated. More detailed description of step 507 is identical to that of step 415 in FIG. 4, and thus will not be repeated herein.

In addition, description of step 509 is identical to that of step 417 in FIG. 4, and thus will not be repeated herein.

Figure 8:
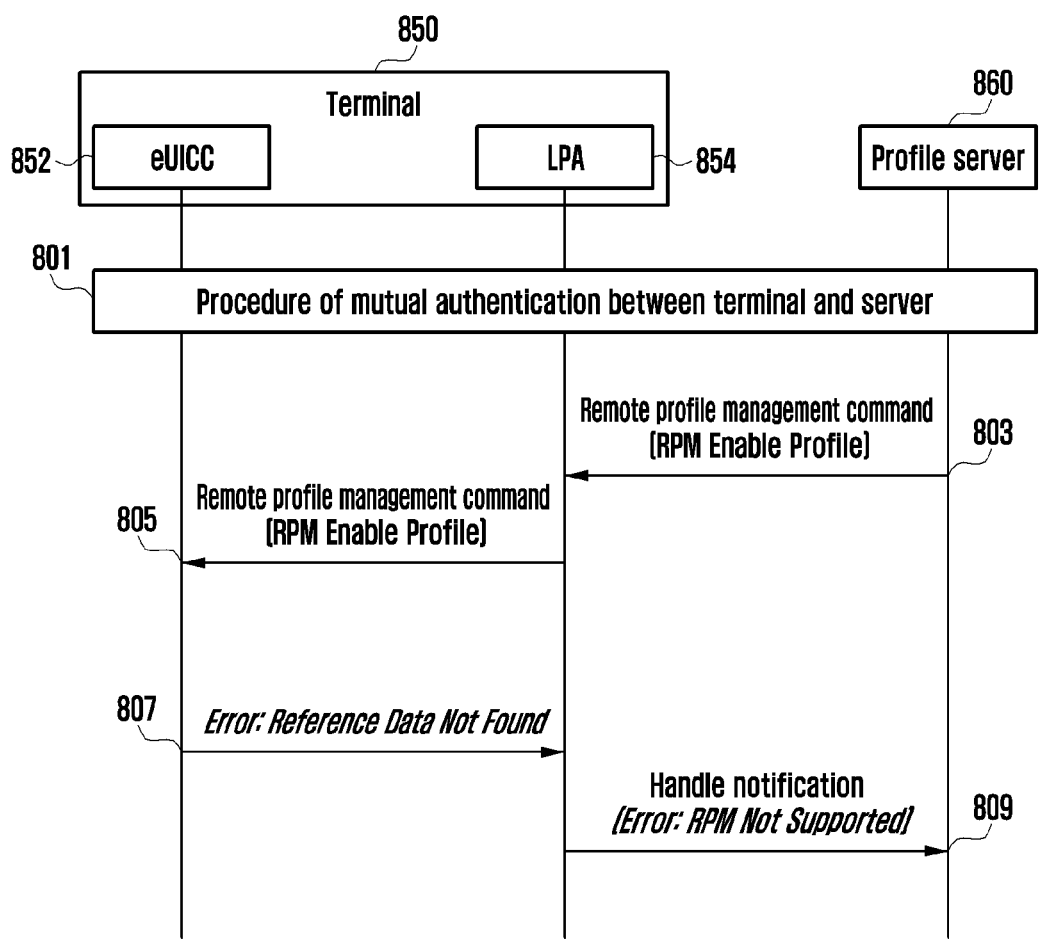
FIG. 8 illustrates a diagram of an example of a normal operation procedure in which a terminal according to an embodiment has received a remote management command from a profile server, but fails in remote management because the eUICC does not support the remote profile management.

Referring to FIG. 5, if it is determined that the eUICC 552 mounted in the terminal 550 does not support the remote profile management function, the terminal 550 may switch the remote management command to an equivalent local management command and then handle the same, unlike the normal procedure of unnecessarily delivering the remote management command (which cannot be handled) to the eUICC 552 with regard to the same condition, thus failing in remote management (corresponding to the following procedure described with reference to FIG. 8).

It is also to be noted that some embodiments of FIG. 5 are not mutually exclusive to some embodiments of FIG. 4, and more than one thereof may be implemented in combination. For example, if it is determined in step 505 of FIG. 5 that the eUICC 552 cannot handle the remote management command, the LPA 554 may preferentially deliver the remote management command to the eUICC 552 as in step 405 of FIG. 4, and may additionally operate as in the operations of step 413 to 415 of FIG. 4 according to the result of reply. Some embodiments regarding such a combined operation of the terminal 250 will be described with reference to FIG. 9.

Meanwhile, it is to be noted that the operation of the terminal 550 determining the function of the eUICC 552 and switching a function not supported by the eUICC 552 such that the LPA 554 handles the same instead is not necessarily limited to the operation of switching the remote management command to a local management command, and is also applicable to other operations that the eUICC 552 need to perform.

Figure 6A:
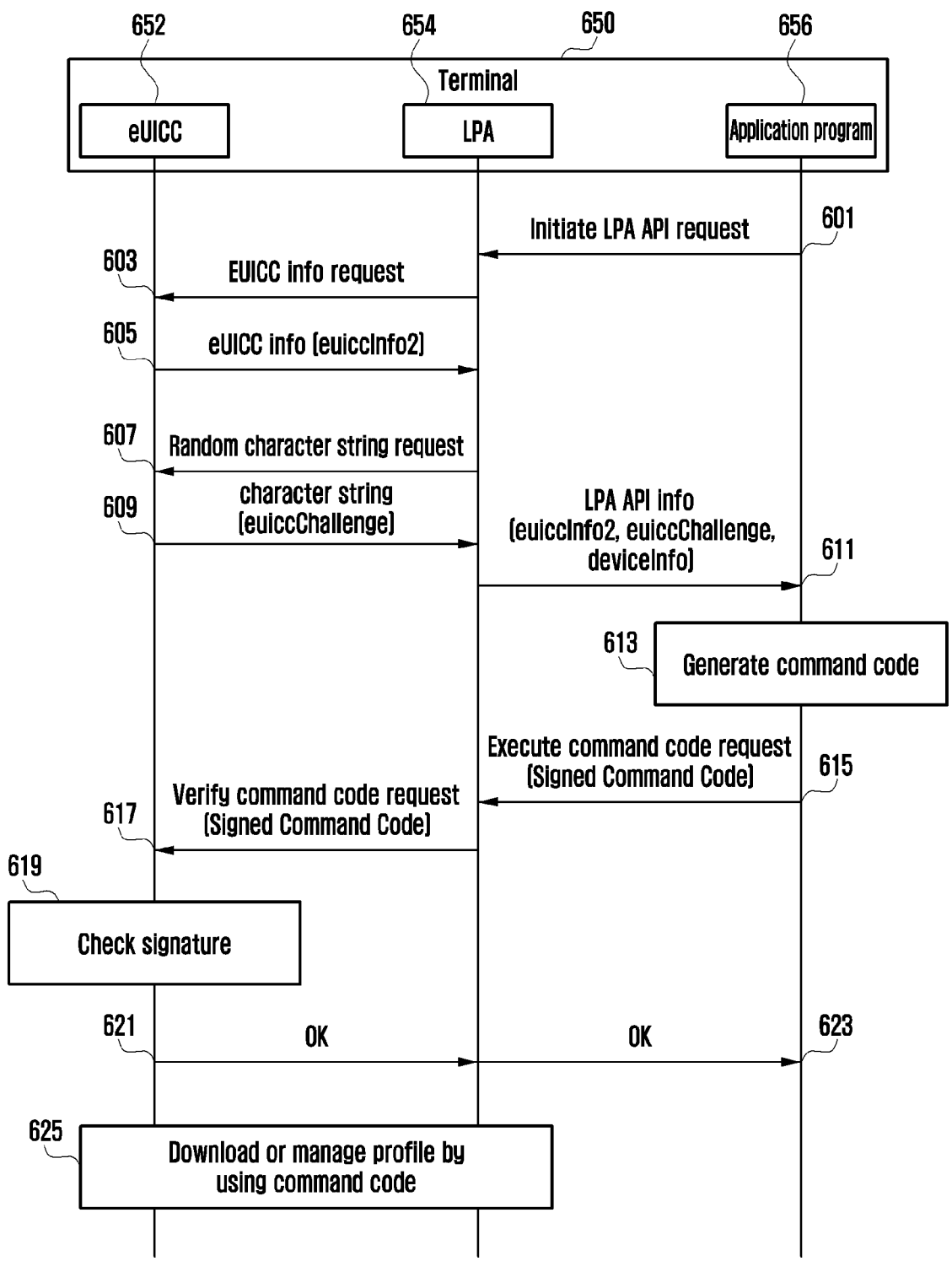
FIG. 6A illustrates a diagram of an example of a terminal operation procedure in which a terminal according to an embodiment successfully handles a command code through a specific application program.
Figure 6B:
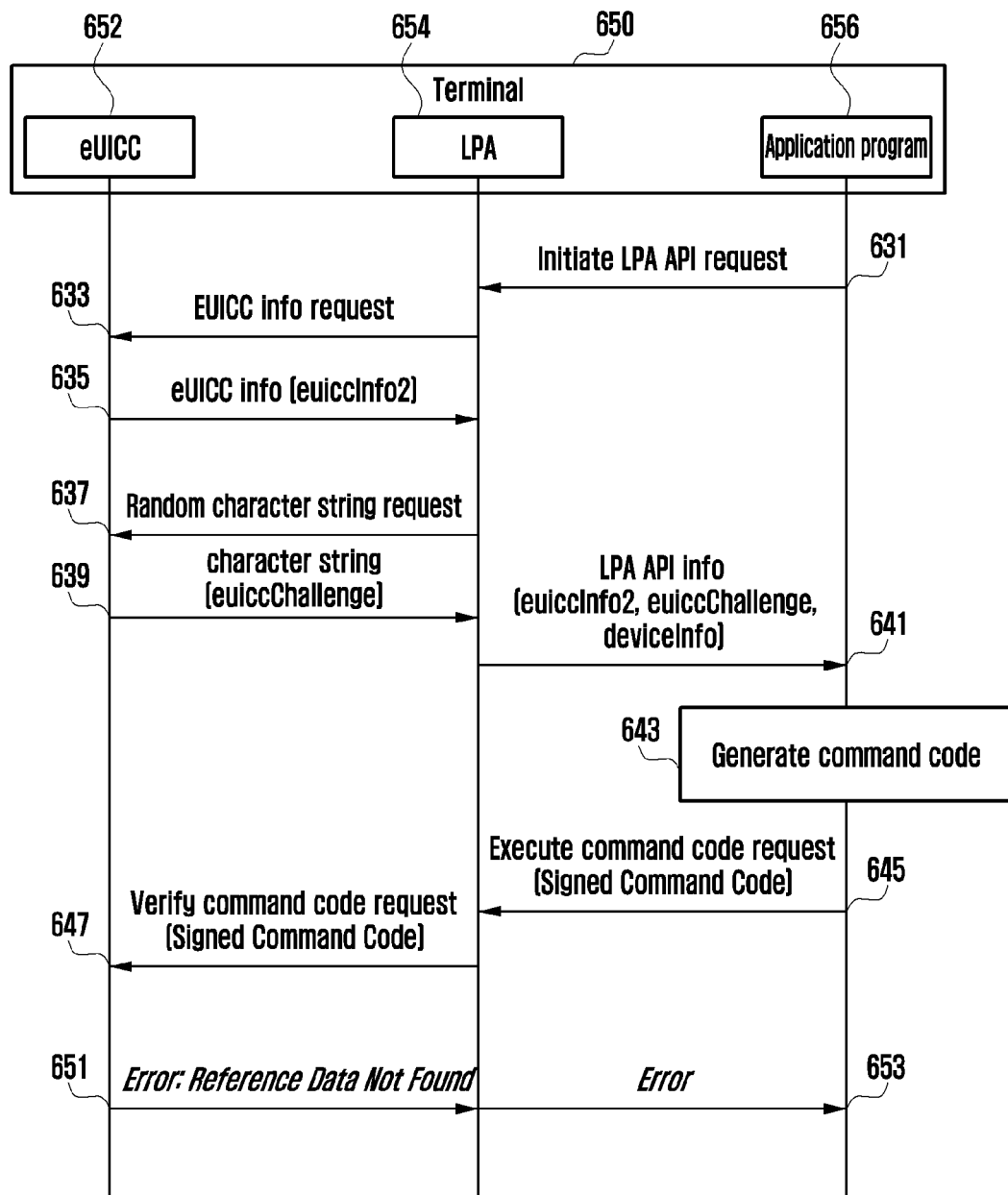
FIG. 6B illustrates a diagram of an example of a terminal operation procedure in which a terminal according to an embodiment fails to handle a command code through a specific application program.
Figure 6C:
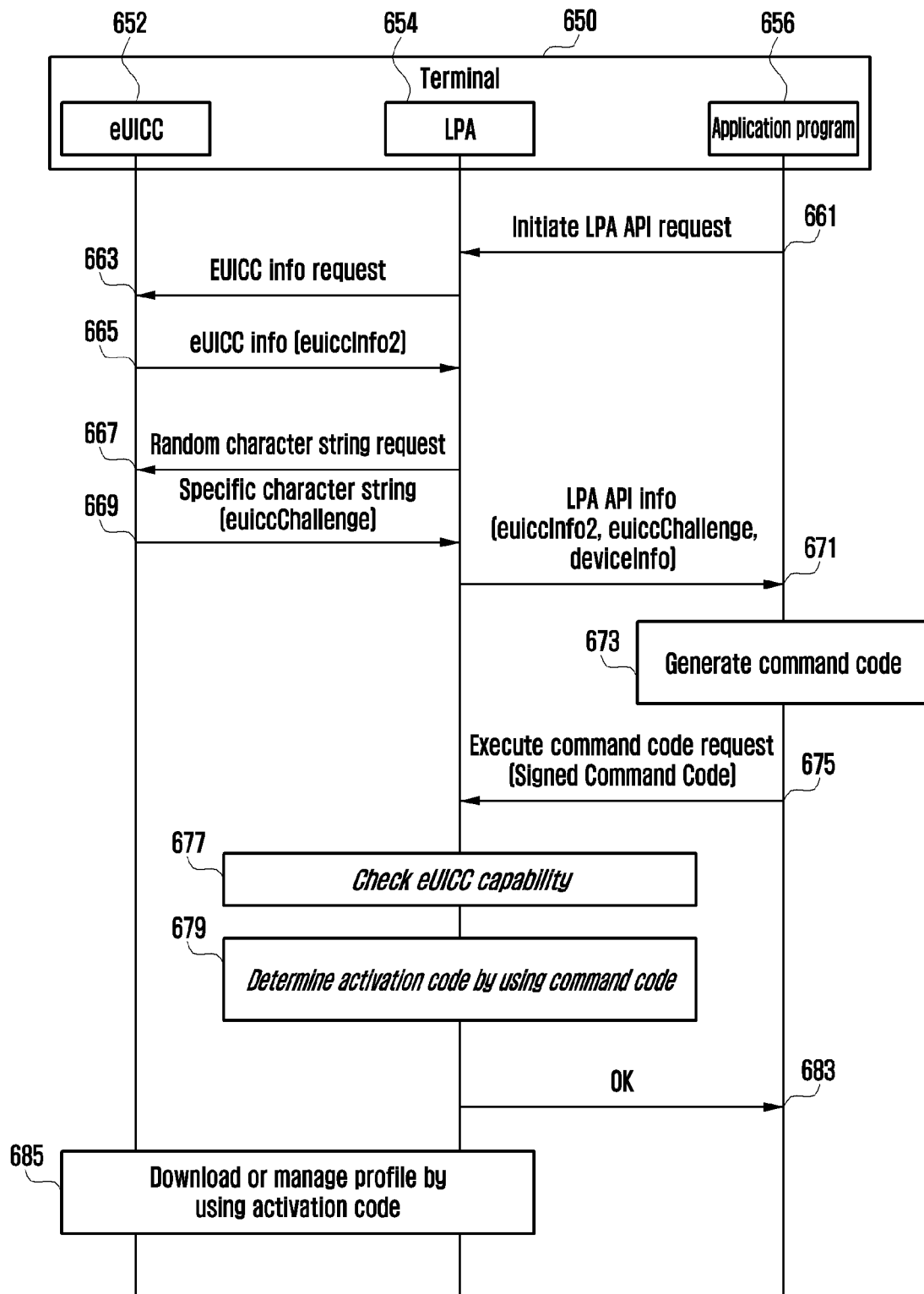
FIG. 6C illustrates a diagram of an example of a terminal operation procedure in which, when a terminal according to an embodiment handles a command code through a specific application program, an LPA switches the command code to an activation code and handles the same.

For example, as illustrated in FIG. 6A to FIG. 6C, if the eUICC cannot authenticate the signature of a profile server, which is necessary to perform a command code, the LPA may switch the command code to an activation code and then handle the same. This will be described in detail with reference to FIG. 6A to FIG. 6C.

FIG. 6A illustrates a diagram of an example of a terminal operation procedure in which a terminal 650 according to an embodiment successfully handles a command code through a specific application program.

In FIG. 6A, the terminal 650 may have an eUICC 652 mounted therein and may have an LPA 654 installed therein so as to control the eUICC 652. In addition, the terminal 650 may have a specific application program 656 (device application or device app) installed therein. The specific application program may have been installed in the terminal by a specific mobile operator such that the user subscribes to the communication service. The specific application program may deliver a command code generated through an external server or the like to the LPA 654 so as to request the LPA 654 to install a profile in the eUICC 652 or to manage the same. Such a function may be referred to as an LPA application programmable interface or LPA API.

Referring to FIG. 6A, in step 601, the application program 656 may request the LPA 654 to start the LPA API. In step 601, the application program may use, for example, an "initiate LPA API request" message.

In step 603, the LPA 654 may request the eUICC 652 to provide eUICC information. In step 603, a "get eUICC info request" message may be used, for example.

In step 605, the eUICC 652 may send eUICC information to the LPA 654 as a reply. In step 605, the eUICC 652 may use, for example, a "get eUICC info response" message including at least eUICC information (euiccInfo2).

In step 607, the LPA 654 may request the eUICC 652 to provide a random character string (random challenge). The challenge may include a random 16-byte number/character string. In step 607, the LPA may use, for example, a "get eUICC challenge request" message.

In step 609, the eUICC 652 may generate a character string and may send the same to the LPA 654 as a reply. In step 609, the eUICC 652 may use, for example, a "get eUICC challenge response" message including at least a character string (euiccChallenge) generated by the eUICC.

In step 611, the LPA 654 may send LPA API info to the application program 656 as a reply. In step 611, the LPA 654 may use, for example, an "initiate LPA API response" message including at least euiccInfo2, euiccChallenge, and deviceInfo.

In step 613, the application program 656 may generate a command code. The application program 656 may generate a command code together with at least one external server (not illustrated). The application program 656 may also generate a command code without interworking with an external server. The command code may at least include, for example, one or more activation codes, may further include a signature of a profile server generated based on the activation code, and may further include at least one digital certificate of the profile server that generated the signature.

In step 615, the application program 655 may deliver the command code to the LPA 654. In step 615, the LPA 654 may use, for example, an "execute command code request" message including at least one command code.

In step 617, the LPA 654 may deliver the command code to the eUICC 652. In step 617, the LPA 654 may use, for example, a "verify command code request" message including at least one command code.

In step 619, the eUICC 652 may verify the signature of the profile server included in the command code. Verification of the signature may be performed by using at least the activation code included in the command code, and at least one digital certificate of the profile server.

In step 621, the eUICC 652 may send the result of verifying the command code to the LPA 654 as a reply. In step 621, the eUICC 652 may use, for example, a "verify command code response" message including at least a result value that expresses the result of verifying the command code as a number string or a character string. Step 621 illustrates an example of the result of successfully verifying the command code.

In step 623, the LPA 654 may send the result of performing the command code to the application program 656 as a reply. In step 623, the LPA 654 may use, for example, an "execute command code response" message including at least a result value that expresses the result of executing the command code as a number string or a character string.

In step 625, the eUICC 652 and the LPA 654 may newly install a profile by using the command code, or may manage an already installed profile. Step 625 may be performed by including at least one profile server 660 not illustrated in FIG. 6A. Step 625 may be, for example, a procedure of managing a profile already installed in the terminal 250 according to the same procedure as in FIG. 2.

Referring to FIG. 6A, the application program 656 installed in the terminal may deliver the command code to the LPA 654 by using the LPA API, and may authenticate the validity of the command code by using the eUICC 652. To this end, the LPA 654 and the eUICC 652 may both need a function for recognizing and interpreting the command code.

FIG. 6B illustrates a diagram of an example of a terminal operation procedure in which a terminal 650 according to some embodiments fails to handle a command code through a specific application program.

Descriptions of the terminal 650, the eUICC 652, the LPA 654, and the application program 656 in FIG. 6B are identical to those made with reference to FIG. 6A, and thus will not be repeated herein. In addition, descriptions of step 631 to step 647 in FIG. 6B are identical to those of steps 601 to 617 in FIG. 6A, and thus will not be repeated herein.

A case will now be described with reference to FIG. 6B, in which the application program 656 installed in the terminal has delivered a command code to the LPA 654 by using the LPA API, but the eUICC 652 has no function for authenticating the validity of the command code. Since the eUICC 652 has no function for authenticating the validity of the command code, the LPA 654 cannot handle the command code.

Therefore, in step 651, the eUICC 652 may send an error code expressing that the received command code cannot be handled to the LPA 654 as a reply. The error code may be expressed by a character string or a number string indicating "reference data not found" (or 0x6a 0x88 in hexadecimal numerical system), for example. Step 651 illustrates an example of the result of failure to verify the command code.

In step 653, the LPA 654 may send the result of executing the command code to the application program 656 as a reply. In step 653, the LPA may use, for example, an "execute command code response" message including at least a result value expressing the result of executing the command code as a number string or a character string. Step 653 illustrates an example of the result of failure to execute the command code.

FIG. 6C illustrates a diagram of an example of a terminal operation procedure in which, when a terminal 650 according to some embodiments handles a command code through a specific application program, the LPA 654 switches the command code to an activation code and then handles the same.

Descriptions of the terminal 650, the eUICC 652, the LPA 654, and the application program 656 in FIG. 6C are identical to those made with reference to FIG. 6A, and thus will not be repeated herein. In addition, descriptions of step 661 to step 675 in FIG. 6C are identical to those of steps 601 to 615 in FIG. 6A, and thus will not be repeated herein.

In step 677, the LPA 654 may check the capability of the eUICC 652. More specifically, the LPA 654 may identify if the eUICC 652 can verify the command code. Such confirmation may be performed in the following exemplary methods, but is not necessarily limited thereto, and step 677 may be omitted if the terminal 650 has already recognized the capability of the eUICC 652.

- The specification version number of the eUICC may be checked so as to identify that, if the specification version number is equal to a predetermined specification version number (for example, v3.0.0), is higher than the same, or is absent, the command code can be handled. It may be identified that, if the specification version number of the eUICC is lower than the predetermined specification version number (v3.0.0), the command code cannot be handled.
- The eUICC RSP capability (or euiccRspCapability) may be checked so as to identify that, if signed command code support (or signedCommandCodeV3Support) is described in the RPM capability, the command code can be handled. It may be identified that, if there is no RSP capability, or if signed command code support is not described in the RSP capability, the command code cannot be handled.

Alternatively, it is possible to determine if the eUICC 652 can handle the command code through the process described with reference to FIG. 6B. If such an process has been performed in advance, information regarding if the eUICC 652 can handle the command code may be stored, and the LPA may check the same in step 677. Alternatively, step 677 may be omitted if the eUICC capability has been recognized through the above process.

In step 679, the LPA 654 may switch the command code to an activation code. More specifically, the LPA 654 may operate in step 679 in the following manner:

The LPA 654 may perform the same operation of the eUICC 652 authenticating the signature of the profile server included in the command code as in step 619 of FIG. 6A. Such authentication of the signature may be performed selectively.

The LPA 654 may extract (or determine) the activation code included in the command code. Extraction of the activation code may be an operation of leaving information necessary for the activation code (for example, address of the profile server and the profile identifier), excluding information which is included in the command code but is unnecessary for the activation code (for example, signature or digital certificate of the profile server).

Description of step 683 is identical to that of step 623 in FIG. 7A, and thus will not be repeated herein. In step 685, the terminal may download a profile by using the activation code, or may receive remote profile management and handle the same.

Referring to FIG. 6C, the application program 656 installed in the terminal may deliver the command code to the LPA 654 by using the LPA API. The LPA 654 may determine that the eUICC 652 cannot authenticate the validity of the command code, may extract the activation code from the command code, may receive profile download or remote profile management, which corresponds to the activation code, from the profile server, and may handle the same. As used herein, the command code includes an activation code and additional data added thereto, and the additional data may be, for example, the signature of the profile server. According to the embodiment of FIG. 6C, compared with the embodiment of FIG. 6B, the LPA 654 may extract the activation code from the command code, even if the eUICC 652 has no function for authenticating the validity of the command code, may receive profile download or remote profile management, which corresponds to the activation code, from the profile server, and may handle the same.

Figure 7:
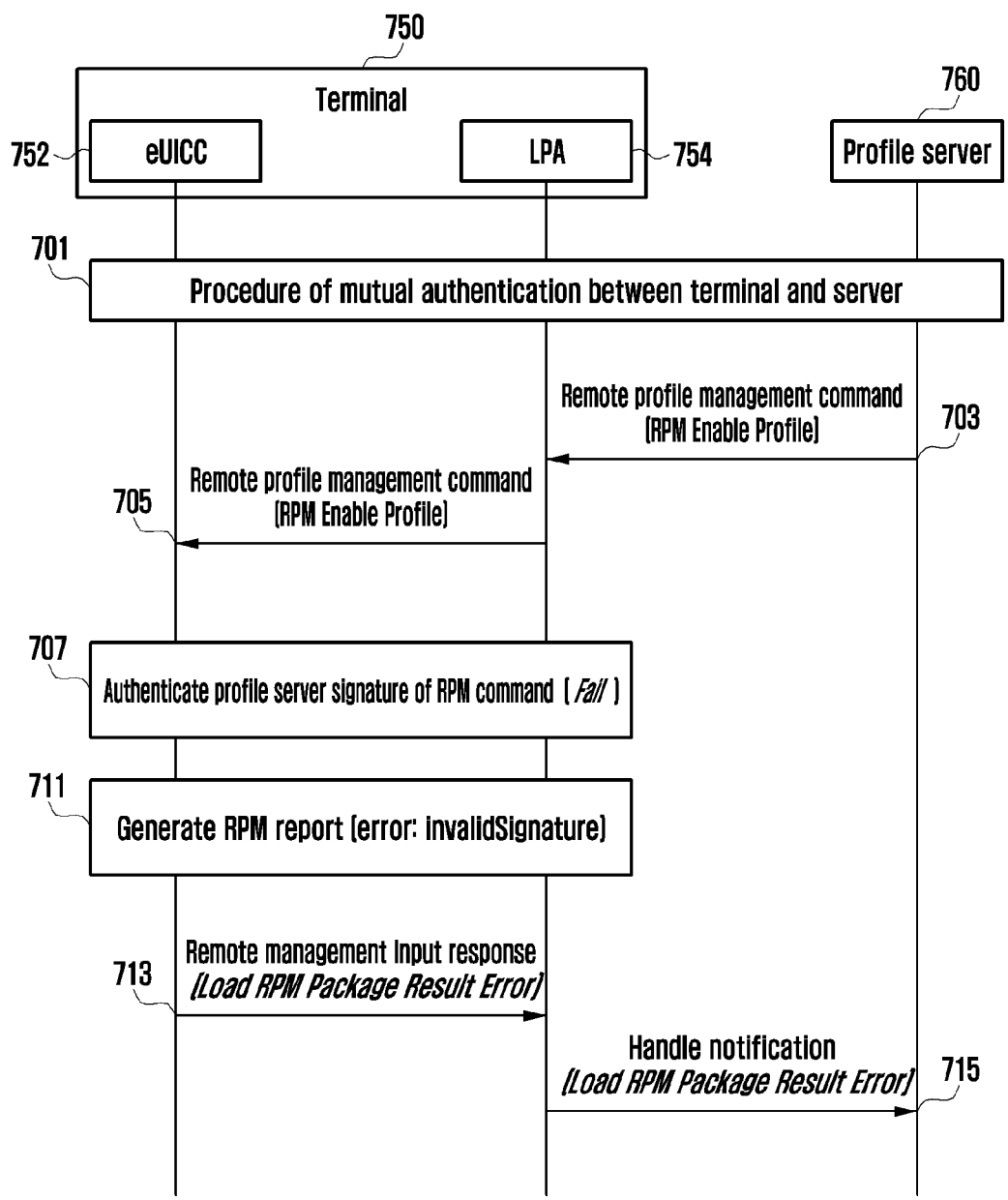
FIG. 7 illustrates a diagram of an example of a terminal operation procedure in which a terminal according to an embodiment has received a remote management command from a profile server, but fails to authenticate the signature of the profile server and thus rejects the remote management.

FIG. 7 illustrates a diagram of an example of a terminal operation procedure in which a terminal 750 according to an embodiment has received a remote management command from a profile server 760, but fails to authenticate the signature of the profile server 760, and thus reject remote management.

In FIG. 7, descriptions of the terminal 750 and the profile server 760 are identical to those made with reference to FIG. 2, and thus will not be repeated herein. In addition, descriptions of step 701 to step 707 in FIG. 7 are identical to those of step 201 to step 205 in FIG. 2, and thus will not be repeated herein.

In step 707, the eUICC 752 may authenticate the digital signature of the profile server 760. Authentication of the digital signature may be calculated at least based on one or more remote management commands received in step 705. If the digital signature fails to be authenticated, the eUICC 752 may perform step 711.

In step 711, the eUICC 752 may generate a remote management input result (load RPM package result). The remote management input result regarding one or more remote management commands received by the eUICC 752 may include, if each remote management is successful, "OK" in the type of at least one character string or a number string corresponding thereto and, if each remote management has failed, an error code indicating the cause of failure in the type of at least one character string or a number string corresponding thereto.

The diagram illustrates a case in which the remote management command received in step 705 is "enable profile" and, due to failure to authenticate the digital signature of the profile server 760, an error code "invalid signature (or invalidSignature)" is generated as a result.

Descriptions of step 713 to step 715 are identical to those of step 713 to step 715 in FIG. 2, and thus will not be repeated herein.

Referring to FIG. 7, compared with FIG. 4, the error code "invalid signature (or invalidSignature)" included in the remote management input result is not the error code "disallowed managing SM-DP+(or disallowedManagingDp)", and the LPA 754 may accordingly refuse to replace remote management with local management after step 713. It is to be noted that such an error code that causes the LPA 754 to refuse to replace remote management with local management is not necessarily limited to "invalid signature (or invalidSignature)", and may be expanded to other error codes.

FIG. 8 illustrates a diagram of an example of a normal operation procedure in which a terminal 850 according to an embodiment has received a remote management command from a profile server 860, but fails in remote management because the eUICC 852 does not support the remote profile management.

In FIG. 8, the terminal 850 may have an eUICC 852 mounted therein and may have an LPA 854 installed therein so as to control the eUICC 852. In addition, the terminal 850 or the eUICC 852 may have one or more profiles installed therein. In addition, each installed profile may have a description of one or more profile servers capable of remotely controlling the profile, or may have no description thereof. In addition, the eUICC 852 may have no remote management command handling function implemented therein, and thus cannot perform the remote management command.

Descriptions of step 801 to step 805 in FIG. 8 are identical to those of step 201 to step 205 in FIG. 2, and thus will not be repeated herein.

In step 807, the eUICC 852 may send an error code indicating that the received remote profile management command cannot be handled to the LPA 854 as a reply. The error code may be expressed as a character string or a number string indicating "reference data not found" (or 0x6a 0x88 in hexadecimal numerical system), for example.

In step 809, the LPA 854 may deliver the result of execution in step 807 to the profile server 860. In step 809, the LPA may use, for example, a handle notification message. The handle notification message may be expressed as a character string or a number string indicating "RPM not supported", for example.

Referring to FIG. 8, if the eUICC 852 does not support remote profile management even through the LPA 854 can handle the remote profile management command, the terminal 850 cannot handle the remote management command received from the profile server 860.

Figure 9:
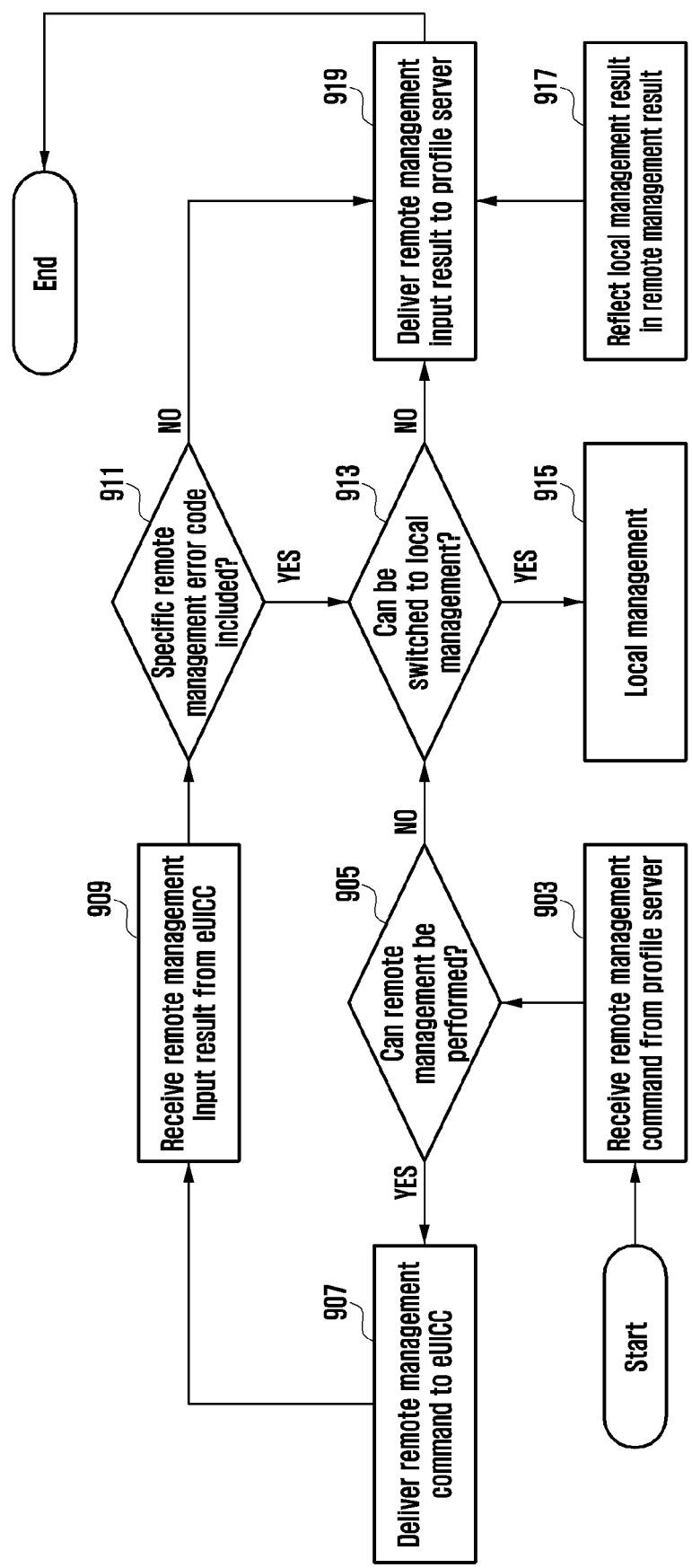
FIG. 9 illustrates a diagram of an example of a procedure in which a terminal according to an embodiment replaces a remote management command with a local management command.

FIG. 9 illustrates a diagram of an example of a procedure in which a terminal according to an embodiment replaces a remote management command with a local management command.

Referring to FIG. 9, in step 901, the terminal may start operating.

In step 903, the terminal may receive a remote management command from a profile server. In step 903, the terminal may receive the remote management command through a terminal authentication response message including at least one remote management command and the digital signature of the profile server, for example.

In step 905, the terminal may determine if the remote management command can be executed. For example, the terminal may determine if the eUICC supports execution of the remote management command. The detailed description of the determination procedure in step 905 is identical to the description of step 505 in FIG. 5, and thus will not be repeated herein. If the terminal cannot execute the remote management command, the terminal may perform step 913. If the terminal can execute the remote management command, the terminal may perform step 907.

In step 907, the terminal may deliver the remote management command to the eUICC. In step 907, the terminal may use, for example, a remote management input request (load RPM package request) message including at least one remote management command and the digital signature of the profile server. The remote management input request message may include part or all of the terminal authentication response message in FIG. 903.

In step 909, the terminal may receive a remote management input result (load RPM package result) from the eUICC. In step 909, the terminal may use, for example, a remote management input response (load RPM package response) message including at least the remote management input result.

In step 911, the terminal may check the content of the remote management input result and may determine if the remote management input result includes a specific remote management error code (or predetermined remote manage error code). The specific remote management error code may be, for example, error code "disallowed managing SM-DP+(or disallowedManagingDp)", error code "profile owner mismatch (or profileOwnerMismatch")", or any other error code known to the terminal.

If the remote management input result does not include the corresponding remote management error code, the terminal may perform step 919.

If the remote management input result includes the corresponding remote management error code, the terminal may perform step 913. The detailed content thereof will be described in the following.

In step 913, the terminal may identify if the remote management command can be switched to a local management command. For example, the terminal may check the manager profile server list of the target profile. The manager profile server list may be checked by using information stored in the eUICC, or by using information cached in the cache of the terminal.

As another example, the terminal may additionally authenticate the profile server that transmitted to the remote management command. To this end, the terminal may identify if the profile server that transmitted the remote management command is included in the profile server list managed by the terminal independently; the terminal may transmit a character string (challenge) to the profile server that transmitted the remote management command and may request a digital signature and/or a digital certificate in response thereto; the terminal may identify if specific data (for example, token) has been delivered together with the remote management command; or the terminal may use other authentication means. The above examples are not necessary used one by one, and more than one thereof may be used in combination. In addition, the above example is only one example of additional authentication, and other methods may also be used.

If the remote management command cannot be switched to a local management command (for example, if the manager profile server list is non-empty, and/or if additional authentication of the profile server fails), the terminal may perform step 919.

If the remote management command can be switched to a local management command (for example, if the manager profile server list is a null list, and/or if additional authentication of the profile server succeeds), the terminal may perform step 915. If it is unclear whether the remote management command can be switched to a local management command or not (for example, if the manager profile server list is an empty list, and/or if results of performing two or more authentications are different from each other), the terminal may selectively perform step 915 or step 919.

In step 915, the terminal may perform local management equivalent to the remote management command. To this end, the terminal may deliver the local management command to the eUICC. The detailed description of step 915 is identical to that of step 415 in FIG. 4, and thus will not be repeated herein.

In step 917, the terminal may switch the local management input result (local management result) to an equivalent remote management input result (load RPM package result). Step 917 may be performed selectively. The detailed description of step 917 is identical to that of step 415 in FIG. 4, and thus will not be repeated herein.

In step 919, the terminal may deliver the remote management input result or the local management input result to the profile server. In step 919, the terminal may use, for example, a handle notification message. The handle notification message may include part or all of the remote management input result or the local management input result.

The terminal may end the step and may wait for following reception of an additional remote management command.

Figure 10:
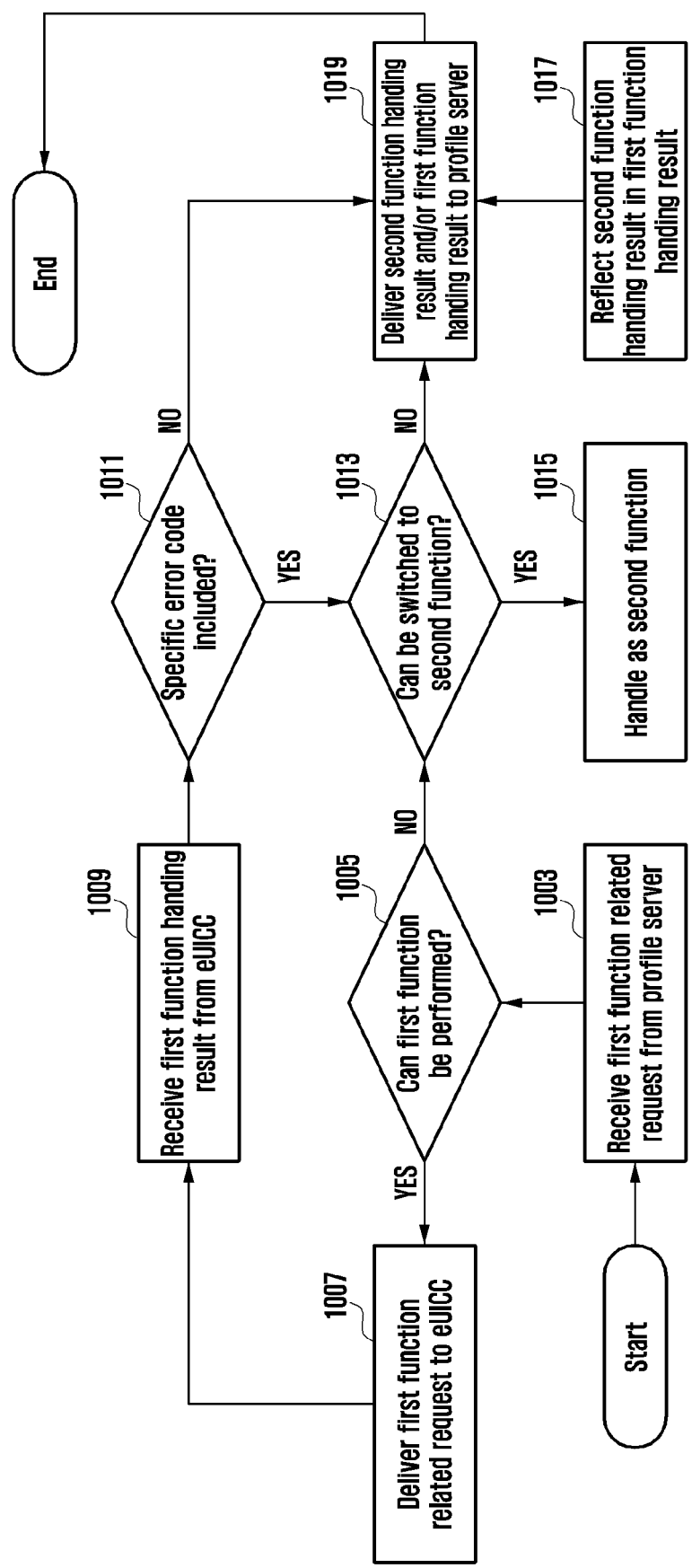
FIG. 10 illustrates a diagram of an example of a procedure in which a terminal according to an embodiment replaces a first-version eSIM function that cannot be handled by a second-version eUICC with an equivalent second-version function.

FIG. 10 illustrates a diagram of an example of a procedure in which a terminal according to some embodiments replaces a first-version eSIM function (new function) that cannot be handled by a second-version eUICC with an equivalent second-version function (old function).

In the following description of the disclosure, with regard to a case in which the second version precedes the first version, a function (eSIM function) that can be handled by the first-version eUICC will be referred to as a first function, and a function that can be handled by the second-version eUICC will be referred to as a second function. However, the embodiment is not limited thereto, and various terms may be used, for example, a new function instead of the first function, and an old function instead of the second function.

Referring to FIG. 10, the terminal may start operating.

In step 1003, the terminal may receive a first function related request from the profile server. That is, the terminal may receive an execution request regarding a first-version eSIM function from a specific application installed in the profile server or the terminal. In step 1003, the terminal may use, for example, a terminal authentication response message including at least one remote management command and the digital signature of the profile server, or an "execute command code request" message including a command code of an activation code.

In step 1005, the terminal may determine if the first function can be executed. For example, the terminal may determine if the specification version number (SVN) of the eUICC or the RSP capability thereof supports the first function. The detailed description of the determination procedure in step 1005 is identical to that of step 505 in FIG.

5 and step 677 in FIG. 6C, and thus will not be repeated herein. If the terminal cannot execute the first function, the terminal may perform step 1013. If the terminal can execute the remote management command, the terminal may perform step 1007.

In step 1007, the terminal may transmit a first function related request (or first function execution request) to the eUICC. In step 1007, the terminal may use, for example, a remote management input request message including at least one remote management command and the digital signature of the profile server, or a "verify command code request" message.

In step 1009, the terminal may receive the result of handing the first function from the eUICC. In step 1009, the terminal may use, for example, a remote management input response message including at least the remote management input result, or a "verify command code response" message.

In step 1011, the terminal may check the result of handing the first function, and may determine if a specific error code is included. The specific error code may be, for example, error code "disallowed managing SM-DP+(or disallowed-ManagingDp)", error code "profile owner mismatch (or profileOwnerMismatch")", error code "reference data not found" (or 0x6a 0x88 in hexadecimal numerical system), or any other error codes known to the terminal.

If the handling result does not include the corresponding error code, the terminal may perform 1019. If the handling result includes the corresponding error code, the terminal may perform 1013.

In step 1013, the terminal may identify if the first function can be switched to the second function. For example, the terminal may check the manager profile server list of the target profile, or may check the SVN of the eUICC or the RSP capability thereof. The information may be checked by using information stored in the eUICC, or by using information cached in the cache of the terminal.

As another example, the terminal may additionally authenticate the profile server that transmitted the remote management command. To this end, the terminal may identify if the profile server that transmitted the remote management command is included in the profile server list managed by the terminal independently; the terminal may transmit a character string (challenge) to the profile server that transmitted the remote management command and may request a digital signature and/or a digital certificate in response thereto; the terminal may identify if specific data (for example, token) has been delivered together with the remote management command; or the terminal may use other authentication means. The above examples are not necessary used one by one, and more than one thereof may be used in combination. In addition, the above example is only one example of additional authentication, and other methods may also be used.

If the first function cannot be switched to the second function, the terminal may perform step 1019. If the first function can be switched to the second function, the terminal may perform step 1015. If it is unclear whether the first function can be switched to the second function or not, the terminal may selectively perform step 1015 or step 1019.

In step 1015, the terminal may handle the second function that is equivalent to the first function. That is, the terminal may deliver second function related information for processing the second function to the eUICC. The detailed description of step 1015 is identical to that of step 415 in FIG. 4 or step 679 in FIG. 6C, and thus will not be repeated herein.

In step 1017, the terminal may switch the result of handing the second function to the result of handing the first function. Step 1017 may be performed selectively. The detailed description of step 1017 is identical to that of step 415 in FIG. 4, and thus will not be repeated herein.

In step 1019, the terminal may deliver the first function handing result and/or the second function handing result to the profile server. In step 1019, the terminal may use a handle notification message.

Then, the terminal may end the operation and may wait for following reception of an additional remote management command.

Meanwhile, as described above, a UICC is a smart card used while being inserted into a mobile communication terminal or the like, and is also referred to as a UICC card. The UICC may include an access control module for accessing a network of a mobile communication operator. Examples of the access control module include a USIM, a SIM, and ISIM. A UICC including a USIM is also referred to as a USIM card. Likewise, a UICC including a SIM module is also referred to as a SIM card.

In the following description of the disclosure, the term "SIM card" may be used in a normal sense including a UICC card, a USIM card, and a UICC including an ISIM. That is, the same technical application to the SIM card may be made to the USIM card, the ISIM card, or a normal UICC card.

The physical shape and logical function of UICC cards are defined by a standardization organization called ETSI (European telecommunications standards institute) such that international compatibility is maintained. In terms of the form factor that defines the physical shape, the size is gradually decreasing, encompassing mini SIM, which is most widely used, micro SIM, and recent nano SIM. This makes a large contribution to compactness of mobile communication terminals, but standardization of UICC cards having smaller sizes than that of the nano SIM is expected to be difficult because users may easily lose the same. In addition, characteristics of attachable/detachable UICC cards require spaces for mounting attachment/detachment slots in terminals. Accordingly, it is expected that any further degree of compactness will be difficult.

The SIM card stores personal information of a mobile communication subscriber, authenticates the subscriber when accessing a mobile communication network, and generates a traffic security key, thereby enabling safe mobile communication use.

The SIM card is normally manufactured, at the request of a specific mobile communication operator, as a dedicated card for the corresponding operator, and authentication information for accessing the network of the corresponding operator, for example, the USIM application, the IMSI, the K value, or the OPc value, is loaded in the card before the card is shipped. Therefore, the manufactured SIM card is delivered to the corresponding mobile communication operator and then provided to the subscriber, and it is also possible to manage (for example, install, modify, or delete) the application inside the UICC by using a technology such as OTA. The subscriber can insert the UICC card into his/her own mobile communication terminal and thereby use the network of the corresponding mobile communication operator and application services. When replacing terminals, the UICC card can be moved/inserted from the existing terminal into a new one such that the same authentication information, mobile communication telephone numbers, person telephone directory, and the like stored in the UICC card can be in the new terminal.

However, the SIM card inconveniences the mobile communication terminal user when he/she wants to receive a service from another mobile communication operator. That is, the mobile communication terminal user needs to inconveniently acquire the SIM card physically in order to receive a service from the mobile communication operator. For example, when he/she is traveling in another nation, the local SIM card needs to be acquired to receive the local mobile communication service, which is inconvenient. A roaming service may remove the inconvenience to some extent, but has a problem in that the service is relatively expensive, and the service is unavailable if there is no contact between the relevant communication operators.

Such inconvenience may be removed to some extent if the subscriber authentication module of the operator performed in the SIM card (that is, SIM profile) is remotely downloaded and installed in a UICC card. That is, the SIM profile of the mobile communication service to be used can be downloaded to the UICC card at a timepoint desired by the user. Multiple SIM profiles may be downloaded and installed in the UICC card, and only one SIM may be selected and used. Such a UICC card may be embedded in the terminal or may not be embedded therein.

Meanwhile, an eUICC structure (a UICC that cannot be easily attached/detached) has been proposed by embedding a security module, which performs a similar function to that of the UICC or SIM card, in a mobile communication terminal when the same is manufactured. This has the same electric characteristics and logical structure as those of the UICC defined by the standardization organization ETSI, while the physical form factor and packaging method have been modified to be more advantageous to compactness, thereby providing variously sized eUICC chips. Such eUICCs include those following the machine-to-machine form factor (MFF) 1 and MFF2 form factors, and also include chips which are not standardized by ETSI but are more advantageous to compactness, such as dual flat no lead (DFN) and wafer level chip scale packaging (WLCSP) schemes.

As such, a UICC used while being embedded in a terminal is referred to as an eUICC. In general, an eUICC refers to a UICC card or UICC chip which is used while being embedded in a terminal, and which is configured such that a SIM module can be remotely downloaded and selected.

In the following description of the disclosure, any type of UICC card configured such that a SIM module can be remotely downloaded and selected will be referred to as an eUICC as a whole. That is, a UICC card configured such that a SIM module can be remotely downloaded and selected will hereinafter be referred to as an eUICC regardless of whether the same is embedded in a terminal or not. In addition, SIM module information that is downloaded will be generally referred to as a SIM profile, an RSP SIM profile, an eUICC profile, or more simply a profile. In addition, in the following description of the disclosure, a terminal having such an eUICC loaded therein will be referred to as an eUICC terminal or an eSIM terminal.

As described above, the SIM module can be remotely downloaded and installed in the following method:

According to a first method, during mutual authentication between an eUICC having a SIM profile stored therein and a remote profile server, only a remote server having the same secret key as the secret key stored in the eUICC may install a profile (operation 1), enable the installed profile (operation 2), or disable the installed profile (operation 3).

That is, according to the first method, only "an entitled server" having the secret key can perform profile management (for example, operation 1, operation 2, operation 3) regarding a specific eUICC, and may safely perform remote management of the profile of the terminal having the eUICC loaded therein.

According to a second method, during authentication between an eUICC having a SIM profile stored therein and a remote profile server, only a remote server which holds the certificate issued by the "reliable certificate issuer" stored in the eUICC, and which can sign with a personal key corresponding to the certificate, can install (operation 1) the profile.

The second method is advantageous in that any server can install a SIM profile in an eUICC as long as the server holds a certificate issued by the reliable certificate issuer. For example, if an eUICC has certificate issuer information managed by a specific organization and stored in the secure area thereof, and if the terminal manufacturer has released a terminal having the corresponding eUICC loaded therein, a mobile operator who wants to download a SIM profile to the terminal and to provide a communication service thereby may operate its own remote profile server having a server certificate issued by the certificate issuer and loaded therein, thereby providing the terminal with a communication service through the server. In contrast, in the case of the first method, in order to install a SIM profile in a specific eUICC terminal, the profile can be downloaded through only one server having a secret key installed in the eUICC. Accordingly, it is unclear who operates the server, thereby limiting marketability.

Certificate-based approaches, as in the case of the second method, are advantageous in terms of manufacturing and operating the eSIM terminal and the remote server. Accordingly, most operators currently support the second method (providing the SIM profile through the remote server), and their number is rapidly increasing. However, since any server can install a profile as long as the same holds an appropriate certificate, an profile may be installed against the user's intention. Accordingly, while downloading and installing any profile, the user's additional confirmation/agreement process on the terminal screen is mandatory. That is, the second method requires the user's intervention in the profile installation operation.

The second method is superior to the first method in terms of performance. Referring to the second method, a terminal receives an encrypted profile through a normal Internet IP network in a batch mode during an application process (AP) with a high speed and excellent communication performance, and then installs the same in the eUICC. Accordingly, the download/installation speed is high, and there is a small probability of download failure. In the case of the first method, the eUICC downloads and installs a profile in an OTA type (the eUICC divides an encrypted profile into multiple parts and receives the same directly with the server through a modem, without going through the AP of the terminal). The speed is much lower, and the probability of download failure is higher.

However, the second method has a limitation in that the user needs to intervene in profile installation, as mentioned above, thereby making it difficult to install and manage a SIM profile remotely with regard to a large number of terminals.

Therefore, the disclosure provides a method and an apparatus wherein, in the process of installing a profile in a terminal, instead of a procedure of confirmation by the user who manipulates the terminal, 1) the terminal user or manager remotely makes confirmation, or 2) a server automatically determines legitimacy of the profile installation content remotely and then installs the profile, thereby managing the profile efficiently with regard to one or more terminals.

Hereinafter, terms used in the disclosure will be defined.

As used herein, "UICC" is a smart card used while being inserted into a mobile communication terminal, and may refer to a chip configured to store personal information of a mobile communication subscriber, such as network access authentication information, telephone directory, and SMS, such that, when accessing a mobile communication network (for example, GSM, WDCMA, or LTE), the subscriber is authenticated, and a traffic security key is generated, thereby enabling safe mobile communication use. Depending on the type of the mobile communication network accessed by the subscriber, the UICC may have a communication application (for example, SIM, USIM, or ISIM) loaded therein. The UICC may also provide an upper-level security function for loading various applications (for example, electronic wallet, ticketing, and electronic passport) therein.

As used herein, "eUICC" refers to a chip-type security module embedded in a terminal, which cannot be inserted into/detached from the terminal (not attachable/detachable type). A profile may be downloaded and installed in the eUICC by using OTA technology. The eUICC may be referred to as a UICC configured such that a profile can be downloaded and installed therein.

In the disclosure, the method for downloading a profile and installing the same in the eUICC by using the OTA technology is also applicable to an attachable/detachable UICC which can be inserted into and detached from a terminal. That is, embodiments are also applicable to a UICC configured such that a profile can be downloaded and installed therein by using the OTA technology.

The term "UICC" may be used interchangeably with "SIM" in the disclosure, and the term "eUICC" may be used interchangeably with "eSIM".

As used herein, "profile" may refer to an application, a file system, an authentication key value, or the like, which is stored in the UICC, and which is packaged in a software type.

As used herein, "SIM profile" may be used in the same sense as the profile, or may refer to information which is included in a SIM application inside the profile, and which is packaged in a software type.

In the disclosure, a profile provisioning server (or remote profile provisioning server) may include the function of generating a SIM profile, performing mutual authentication with an eUICC by using a certificate and a digital signature, encrypting the generated profile by using an encryption key agreed on during the mutual authentication, or providing the encrypted profile to a terminal, and may be referred to as SM-DP+.

In the disclosure, a profile management server (or remote profile management server) may include the function of generating a remote profile management command, performing mutual authentication with an eUICC by using a certificate and a digital signature, or subjecting the generated remote profile management command to MAC protection by using a MAC protection key agreed on during the mutual authentication, and may be referred to as managing SM-DP+.

A profile provisioning server, as used herein, may also incorporate the function of the profile management server. Accordingly, the operation of a profile provisioning server in various embodiments described below may also be performed by a profile management server. Likewise, an operation described with regard to a profile management server may also be performed by a profile provisioning server. In addition, a profile provisioning server, when incorporating the function of a profile management server, may also be simply referred to as a profile server (or remote profile server).

The term "terminal" as used herein may be referred to as a mobile station (MS), user equipment, a user terminal, a wireless terminal, an access terminal, a terminal, a subscriber unit, a subscriber station, a wireless device, a wireless communication device, a wireless transmit/receive unit, a moving node, a mobile, or other terms.

Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include, but is not limited to a M2M terminal and a MTC terminal/device.

In the disclosure, the terminal may also be referred to as an electronic device or simply a device. Unless otherwise specified, the terminal or device refers to a terminal in which an eUICC is loaded or can be loaded therein.

In the disclosure, the terminal or device may include software or an application installed in the terminal or the electronic device so as to control the UICC or the eUICC. The software or application may be referred to as a LPA, for example.

In the disclosure, the terminal or device may include software or an application installed in the terminal or device so as to approach the LPA and to control the UICC or eUICC through the LPA. The software or application may be referred to as service app, for example. The service app may be an independent application or of an API type.

In the disclosure, the eUICC ID may be a unique ID of the eUICC embedded in a terminal, and may be referred to as an EID.

In the disclosure, the term "SIM profile" may be used interchangeably with a profile package, may be used to denote the data object of a specific profile, and may be referred to as a profile TLV or a profile package TLV. If a profile package is encrypted by using an encryption parameter, the same may be referred to as a protected profile package or a protected profile package TLV. When a profile package is encrypted by using an encryption parameter that can be decrypted only by a specific eUICC, the same may be referred to as a bound profile package or a bound profile package TLV. A profile package TLV may be a data set expressing information constituting the profile in a tag/length/value (TLV) format.

As used herein, "remote profile management" may be referred to as profile remote management, remote management, a remote management command, a remote command, a remote profile management package, a profile remote management package, a remote management package, a remote management command package, or a remote command package. The RPM may be used in order to change the state of a specific profile (enabled, disabled, or deleted) or to update the content of a specific profile (for example, profile nickname or profile metadata).

Furthermore, in the following description of the disclosure, a detailed description of known functions or configurations incorporated herein will be omitted when it may make the subject matter of the disclosure rather unclear.

Hereinafter, proposed embodiments will be described with reference to the drawings.

Figure 11A:
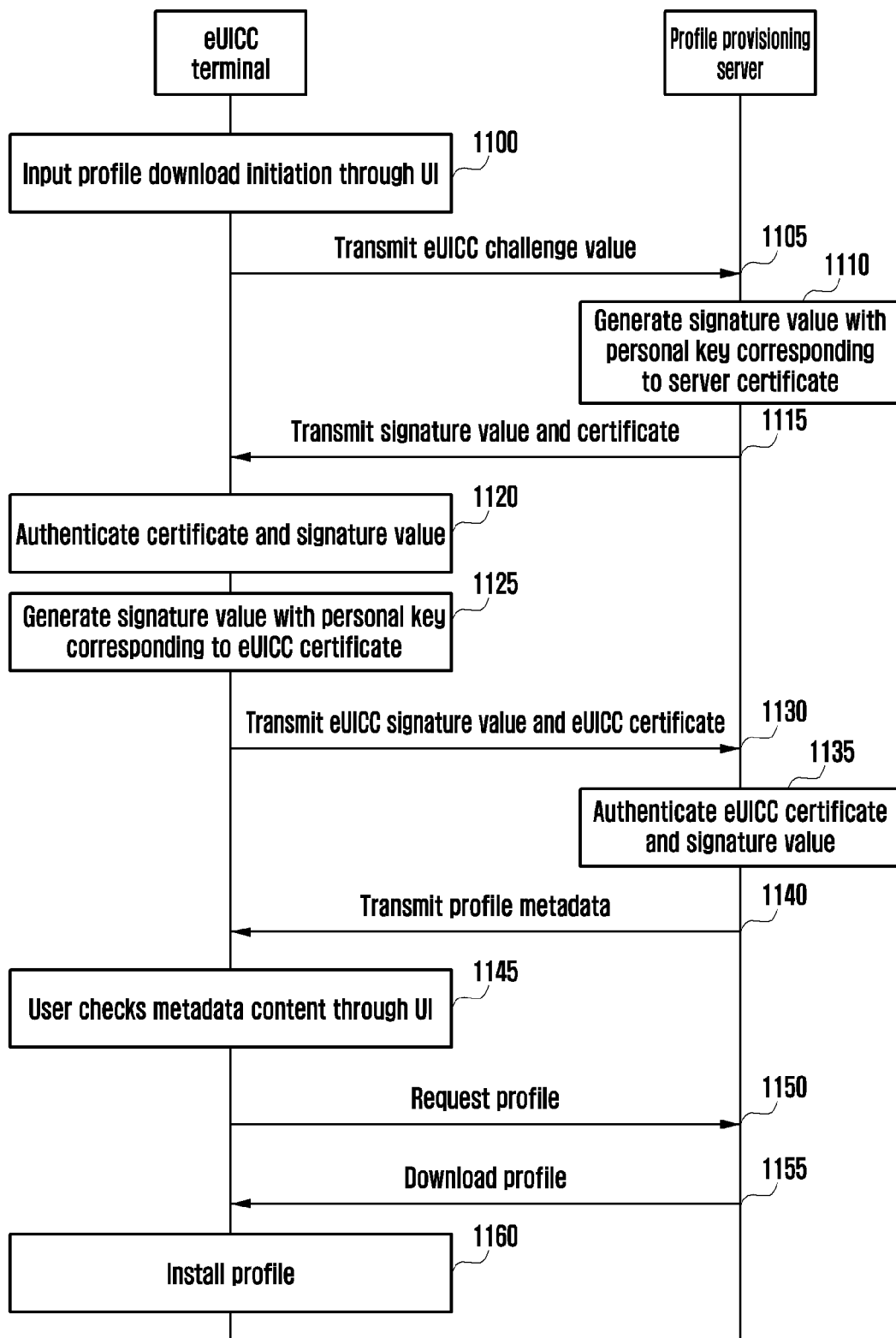
FIG. 11A illustrates a diagram of a method for downloading a profile according to the disclosure.
Figure 11B:
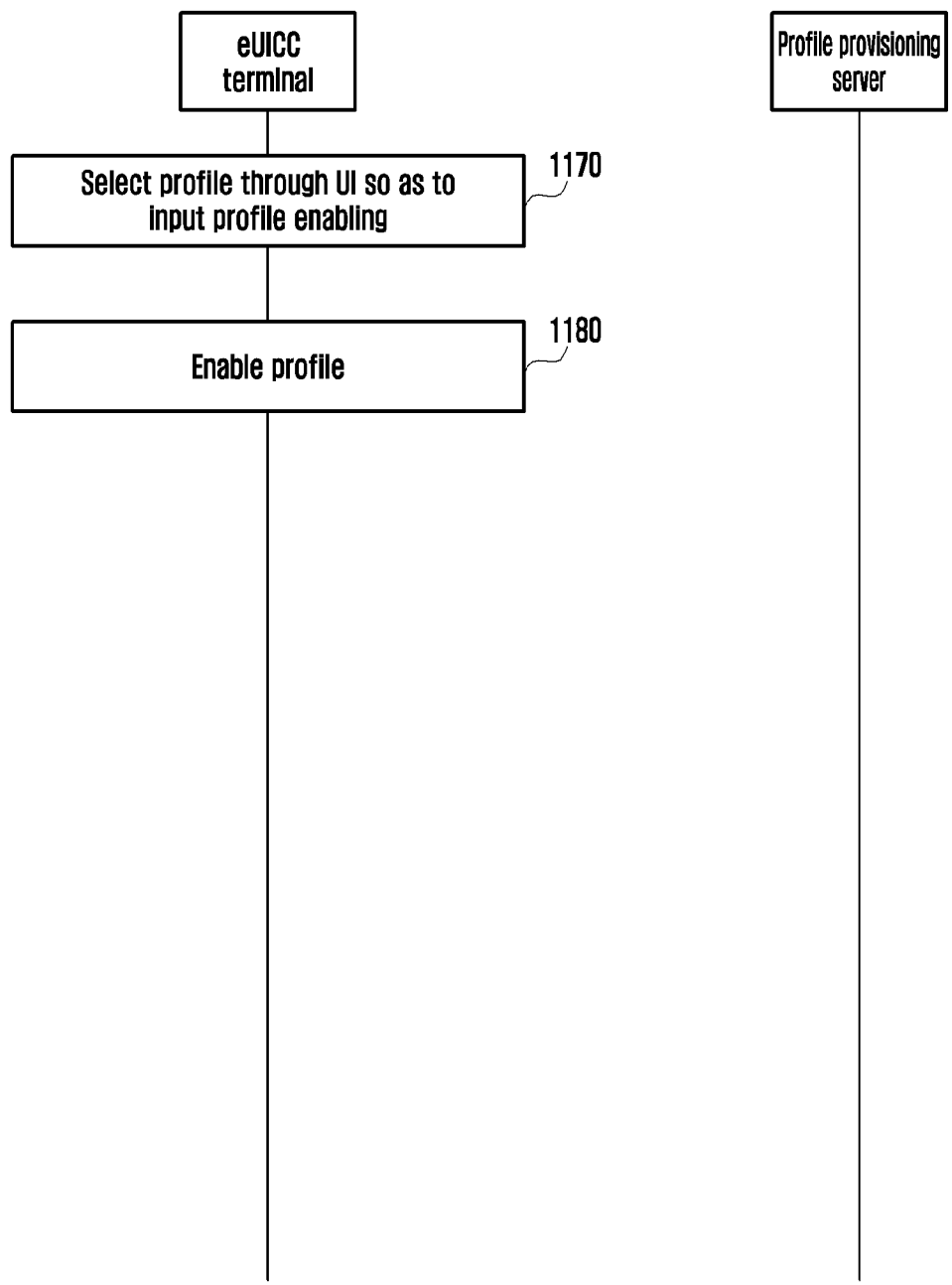
FIG. 11B illustrates a diagram of a method for downloading a profile according to the disclosure.

FIG. 11A illustrates a diagram of a method for downloading and manipulating a SIM profile while locally manipulating a terminal, and FIG. 11B illustrates a diagram of a method for downloading and manipulating a SIM profile while locally manipulating a terminal.

Referring to FIG. 11A, in step 1100, the eUICC terminal initiates profile download through the user's input through the UI of the terminal.

Therefore, the terminal delivers an eUICC challenge value to the profile provisioning server in step 1105.

Then, the profile provisioning server may calculate signature data (or signature value) regarding information including the eUICC challenge value by using a personal key corresponding to the certificate of the server in step 1110. The certificate of the server may include an elliptic curve digital signature algorithm (ECDSA) certificate, and the signature data may include ECDSA signature data.

In addition, the profile provisioning server may deliver the signature data generated by the server and the certificate to the eUICC terminal in step 1115.

The terminal may then authenticate the certificate and the signature data in step 1120.

If the authentication is passed, the eUICC terminal may calculate eUICC signature data by using a personal key corresponding to the certificate stored in the eUICC in step 1125.

In addition, the eUICC terminal may provide the eUICC signature data and the eUICC certificate to the profile provisioning server in step 1130.

Thereafter, the profile provisioning server may authenticate the eUICC certificate and the eUICC signature data in step 1135.

If the result of authentication is successful, and if there is a profile to download to the eUICC terminal, the profile server preferentially delivers profile metadata to the eUICC terminal in step 1140.

The eUICC terminal displays information of all or part of the received profile metadata through the UI of the terminal or through a UI of another terminal directly connected to the terminal through near-field communication (for example, BT, NFC, UWB, or WiFi), and may continue profile installation in step 1145 after the user checks the content of the UI.

When it is determined to continue profile installation, the eUICC terminal requests the profile provisioning server to provide a profile in step 1150.

The profile provisioning server checks the profile request in step 1155 and downloads a profile including profile metadata to the eUICC terminal.

Thereafter, the eUICC terminal additionally authenticates if the profile metadata in the profile in step 1155 is identical to the profile metadata in step 1140, and then installs the profile in the eUICC.

FIG. 11B illustrates a process of a terminal enabling a profile. Referring to FIG. 11B, following the procedure of FIG. 11A, the terminal user may select the profile through the UI of the terminal in step 1170 so as to input "enable profile".

The eUICC terminal may then enable the profile in step 1180, and may access the mobile communication network by using access information (for example, IMSI or Ki) inside the profile.

Figure 12A:
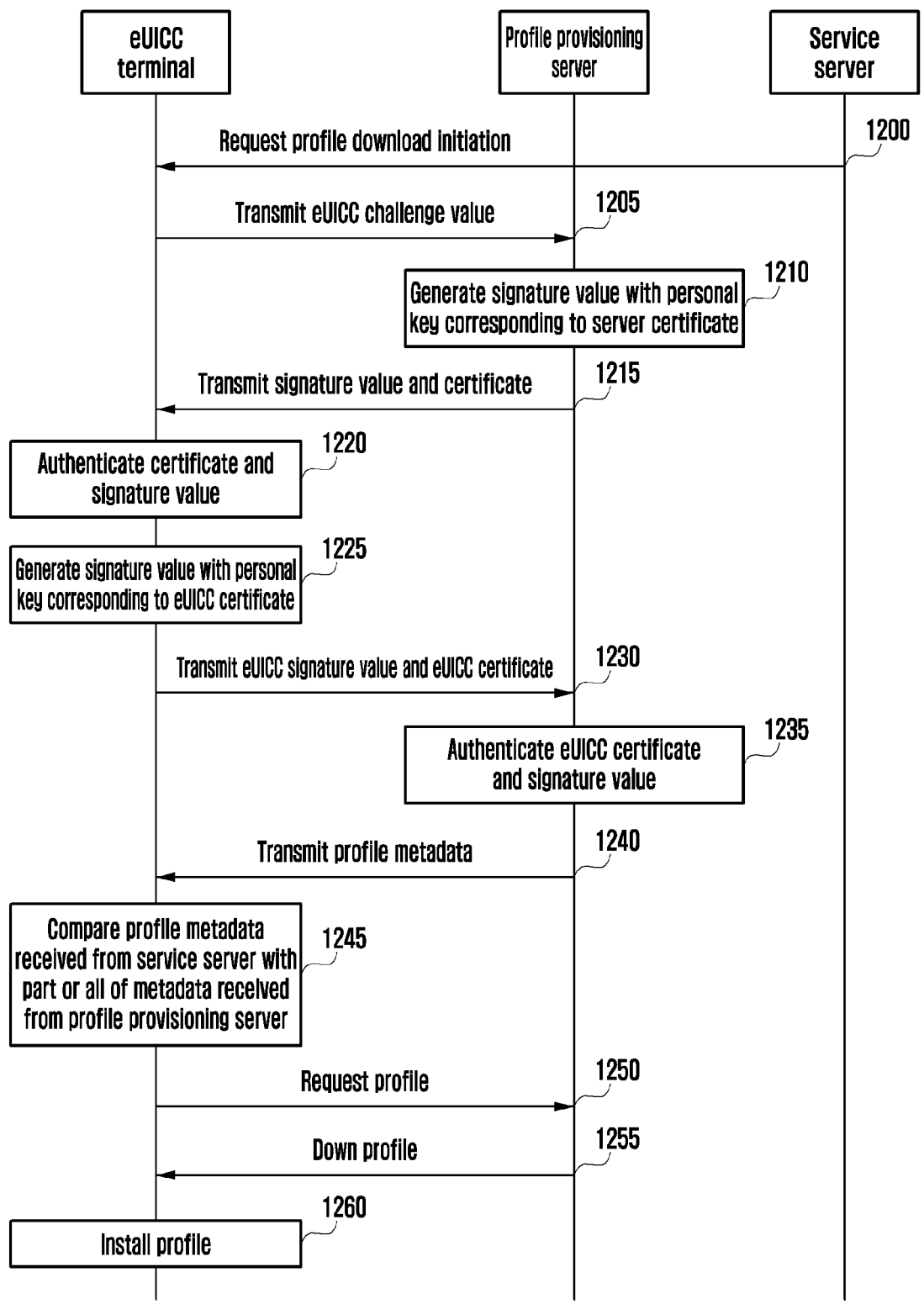
FIG. 12A illustrates a diagram of a method for installing and enabling a profile according to an embodiment.
Figure 12B:
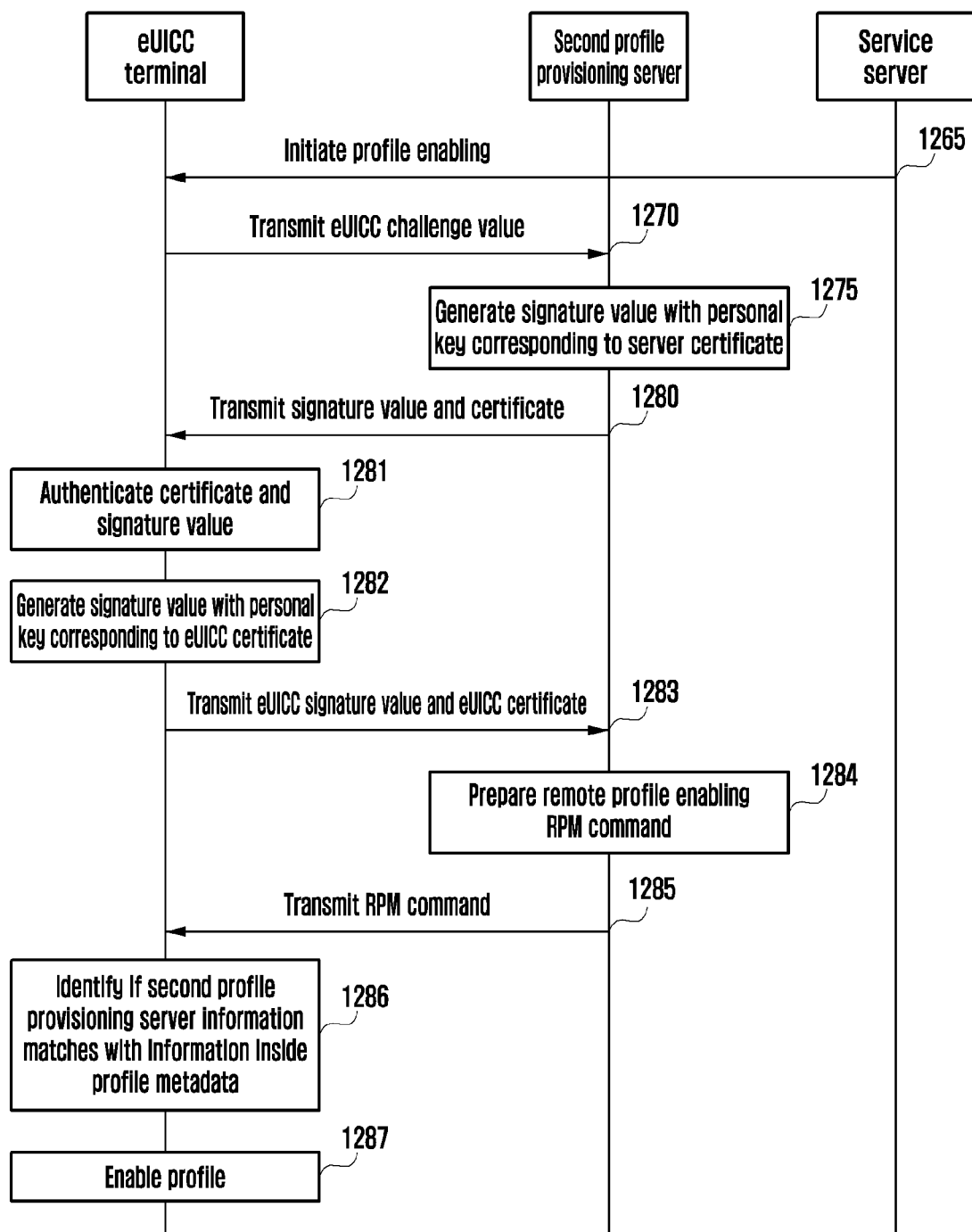
FIG. 12B illustrates a diagram of a method for installing and enabling a profile according to an embodiment.

FIG. 12A illustrates an embodiment of an apparatus and a method for remotely performing profile installation and profile enabling through a remote management server according to the disclosure, and FIG. 12B illustrates an embodiment of an apparatus and a method for remotely performing profile installation and profile enabling through a remote management server according to the disclosure.

Referring to FIG. 12A, the service server (or remote management server) may request the eUICC terminal to initiate profile download in step 1200. The service server may deliver all or part of profile metadata information of the profile to be installed, to the eUICC terminal. In addition, the information delivered to the eUICC terminal may include at least one of second profile provisioning server information, managing SM-DP+ server information, or profile management server information.

Meanwhile, prior to step 1200, an ID corresponding to the eUICC terminal may be registered in the service server in advance by the user of the eUICC terminal or by the manager. The ID may be permanent or temporary. The ID may include the ID of the eUICC (EID), the IMFI of the terminal, the serial ID of the terminal, or any other information (ID) that can be used to identify the terminal. In addition, the ID may be an ID that can be used to identify the terminal only between the terminal and the remote management server, or a globally unique terminal ID.

In addition, the eUICC terminal may register the ID or a value corresponding to the ID in the remote server, prior to step 1200. This guarantees that, when the user or manager has designated a specific eUICC terminal or a terminal group including the eUICC terminal, the profile initiation request in step 1200 can be delivered to an appropriate eUICC terminal.

In order to deliver the request in step 1200 to the appropriate eUICC terminal, the eUICC terminal also needs to register the EID or ID in the remote management server, and the procedure related thereto will be described later with reference to FIG. 15.

Meanwhile, the above disclosure is applicable not only to the drawings, but to the entire specification of the disclosure.

Following steps 1210 to 1280 may be identical or similar to steps 1105 to 1140 in FIG. 11A. a detailed description thereof will be omitted herein.

In step 1245, the eUICC terminal may compare all or part of the profile metadata information received from the service server in step 1200 with all or part of the profile metadata information delivered from the profile provisioning server in step 1240. If the two match, profile download and installation processes may proceed, and if the two do not match, the profile download and installation processes may be ended. If the profile is installed remotely in this manner, the profile can be managed efficiently through a step of additionally authenticating the validity of the profile, and reliability of the profile installation can be improved. Meanwhile, the profile provisioning server according to the disclosure may be referred to as a first profile provisioning server to be distinguished from a second profile provisioning server. The first profile provisioning server is a server for profile download, and may include the above-mentioned SM-DP, SM-DP+, and the like. The second profile provisioning server may include the above-mentioned managing SM-DP+, manager profile server, and the like.

A part of the profile metadata may be second profile provisioning server information, managing SM-DP+ server information, or profile management server information. This may be equally applied to the following embodiments.

If it is determined to continue profile download and installation, the eUICC terminal requests the profile provisioning server to provide a profile in step 1250.

The profile provisioning server checks the profile request in step 1255 and downloads a profile including profile metadata to the eUICC terminal.

Thereafter, the eUICC terminal may additionally authenticate if the profile metadata in the profile in step 1255 is identical to the profile metadata in step 1240, and may install the profile in the eUICC in step 1260.

FIG. 12B illustrates a diagram of a method for enabling a profile by a terminal according to an embodiment.

Referring to FIG. 12B, following the procedure of FIG. 12A, the service server may deliver profile enabling initiation of the SIM profile installed in FIG. 12A to the eUICC terminal in step 1265. The procedures illustrated in FIG. 12A and FIG. 12B are not necessarily performed continuously, and a process of downloading a profile through the procedure of FIG. 12A and a profile enabling procedure according to FIG. 12B may be performed as separate procedures. It is also obvious that, if a profile has already been downloaded, only the procedure of FIG. 12B may be performed.

The enabling command initiation may directly denote enabling of a specific profile by the corresponding initiation command only, but may simply indicate, in the embodiment, that an eUICC challenge is sent to a specific second profile server, managing SM-DP+, or profile management server so as to request authentication.

The following operations between the eUICC terminal and the second profile server in steps 1270 to 1283 may be identical or similar to steps 1205 to 1230 in FIG. 12A.

In step 1284, the second profile server may authenticate the eUICC certificate and eUICC signature data received in step 1200.

If the authentication is passed, the second profile server may prepare an RPM command or RPM package to be delivered to the eUICC terminal, if the same exists.

In step 1285, the second profile server may deliver the same to the eUICC terminal.

In step 1286, the eUICC terminal authenticates the received RPM command or RPM package and identifies if the server information of the second profile provisioning server matches with the information inside the profile metadata included in the profile corresponding to the RPM command or to an RPM command included in the RPM package.

If the two match, the terminal may execute the RPM command. If the RPM command indicates enabling of a specific profile, the terminal may enable the profile in step 1287.

Therefore, the terminal may access the mobile communication network by using access information (IMSI or Ki information) inside the corresponding profile.

After enabling the profile that can be managed through the second profile provisioning server, disabling the profile is also possible only through the second profile provisioning server. In addition, the eUICC of the eUICC terminal can enable a maximum of only one SIM profile at a given moment, and the installed profile can be enabled/disabled only through the second profile provisioning server.

Figure 13A:
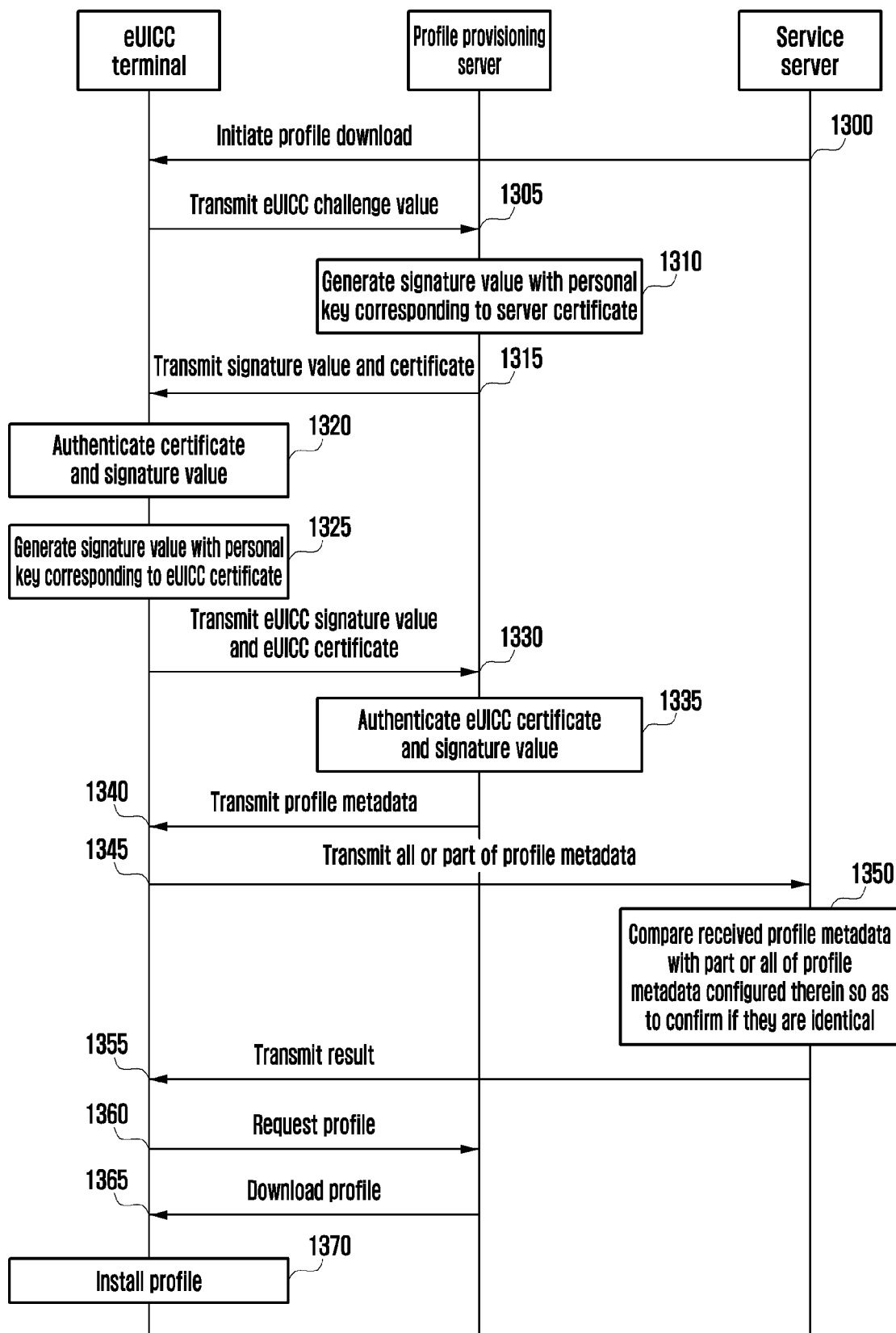
FIG. 13A illustrates a diagram of another method for installing and enabling a profile according to an embodiment.
Figure 13B:
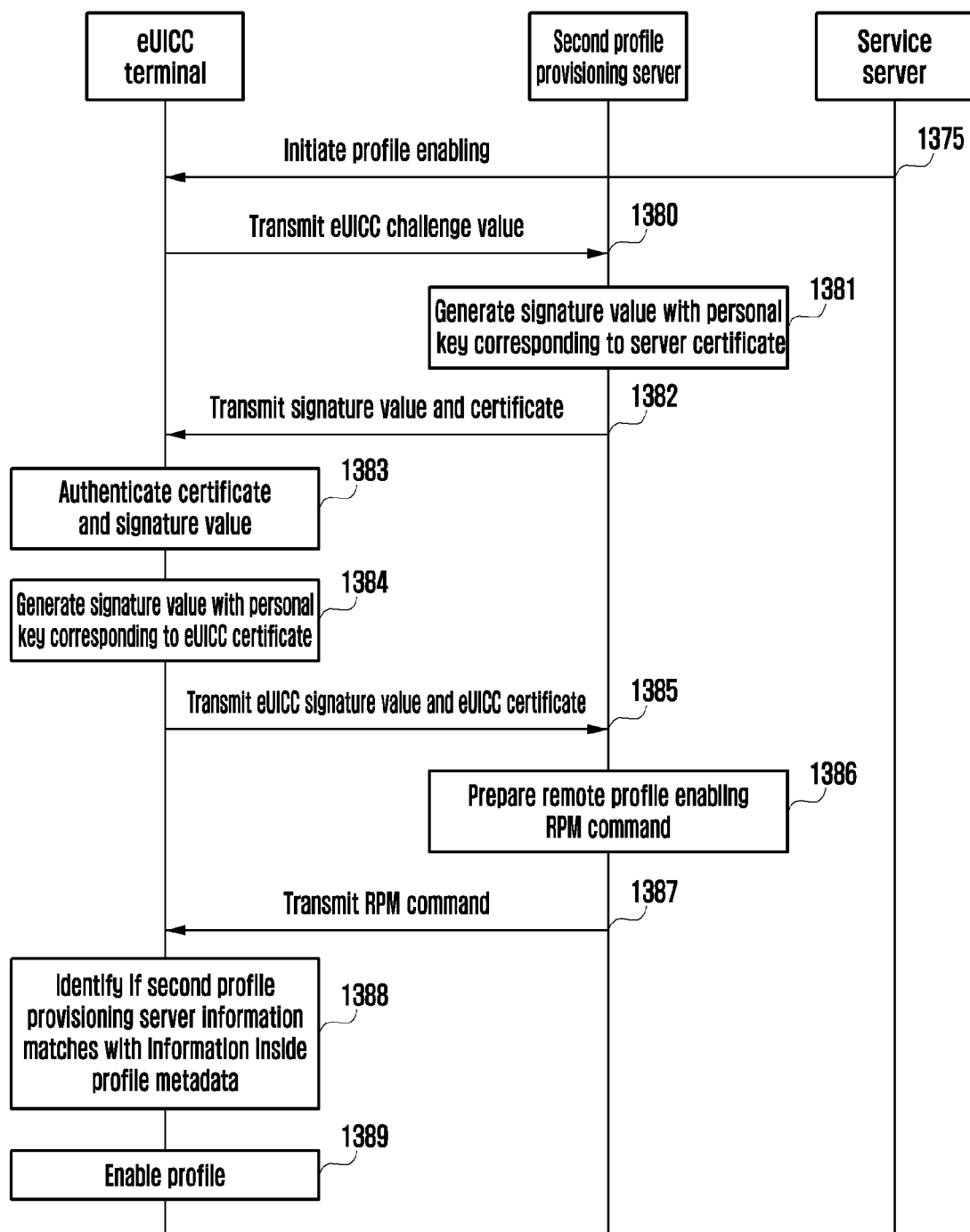
FIG. 13B illustrates a diagram of another method for installing and enabling a profile according to an embodiment.

FIG. 13A illustrates another embodiment of an apparatus and a method for remotely performing profile installation and profile enabling through a remote management server according to an embodiment, and FIG. 13B illustrates another embodiment of an apparatus and a method for remotely performing profile installation and profile enabling through a remote management server according to an embodiment.

Referring to FIG. 13A, the service server (remote management server) may request the eUICC terminal to initiate profile download in step 1300.

Following steps 1305 to 1340 may be identical or similar to steps 1205 to 1240 in FIG. 12A. a detailed description thereof will be omitted herein.

In step 1345, the terminal may deliver all or part of profile metadata information received from the profile provisioning server in step 1340 to the service server.

In step 1350, the service server may compare information regarding all or part of the profile metadata received in step 1345 with all or part of profile metadata preconfigured in the service server, thereby confirming if the two are identical. Particularly, the preconfigured value may include information regarding the second profile provisioning server, and the service server may compare the preconfigured second profile provisioning server information with the received information.

In the embodiment, the service server compares information regarding all or part of the profile metadata received from the terminal with information preconfigured in the service server such that only a profile having appropriate second profile provisioning server information confirmed therein is installed in the terminal, and only the second profile provisioning server is allowed to participate in operations of managing the installed profile. After the authentication is passed, the following procedure is conducted.

Meanwhile, if the authentication is not passed, the process may be ended such that the corresponding profile is not installed.

If the authentication is passed, the service server may transmit the result to the terminal to inform that the authentication is successful in step 1355. After receiving the response regarding successful authentication, the terminal may proceed from step 1360 to step 1370 and install the profile.

Operations between step 1360 and step 1370 may be identical or similar to steps 1250-1260 in FIG. 12A.

FIG. 13B illustrates a diagram of a method for enabling a profile by a terminal according to an embodiment.

Referring to FIG. 13B, following the procedure of FIG. 13A, the service server may deliver profile enabling initiation of the SIM profile installed in FIG. 13A to the eUICC terminal. The procedures illustrated in FIG. 13A and FIG. 13B are not necessarily performed continuously, and a process of downloading a profile through the procedure of FIG. 13A and a profile enabling procedure according to FIG. 13B may be performed as separate procedures. It is also obvious that, if a profile has already been downloaded, only the procedure of FIG. 13B may be performed.

The enabling command initiation may directly denote enabling of a specific profile by the corresponding initiation command only, but may simply indicate, in the embodiment, that an eUICC challenge is sent to a specific second profile server, managing SM-DP+, or profile management server so as to request authentication.

The following operations between the eUICC terminal and the second profile server in steps 1380 to 1385 may be identical or similar to steps 1205 to 1230 in FIG. 12A.

In step 1386, the second profile server may authenticate the eUICC certificate and eUICC signature data received in step 1385.

If the authentication is passed, the second profile server may prepare an RPM command or RPM package to be delivered to the eUICC terminal, if the same exists.

In step 1387, the second profile server may deliver the same to the eUICC terminal.

In step 1388, the eUICC terminal authenticates the received RPM command or RPM package and confirms if the server information of the second profile provisioning server matches with the information inside the profile metadata included in the profile corresponding to the RPM command or to an RPM command included in the RPM package.

If the two match, the terminal may execute the RPM command. If the RPM command indicates enabling of a specific profile, the terminal may enable the profile in step 1389.

Therefore, the terminal may access the mobile communication network by using access information (IMSI or Ki information) inside the corresponding profile.

After enabling the profile that can be managed through the second profile provisioning server, disabling the profile is also possible only through the second profile provisioning server. In addition, the eUICC of the eUICC terminal can enable a maximum of only one SIM profile at a given moment, and the installed profile can be enabled/disabled only through the second profile provisioning server.

Figures 1, 14A:
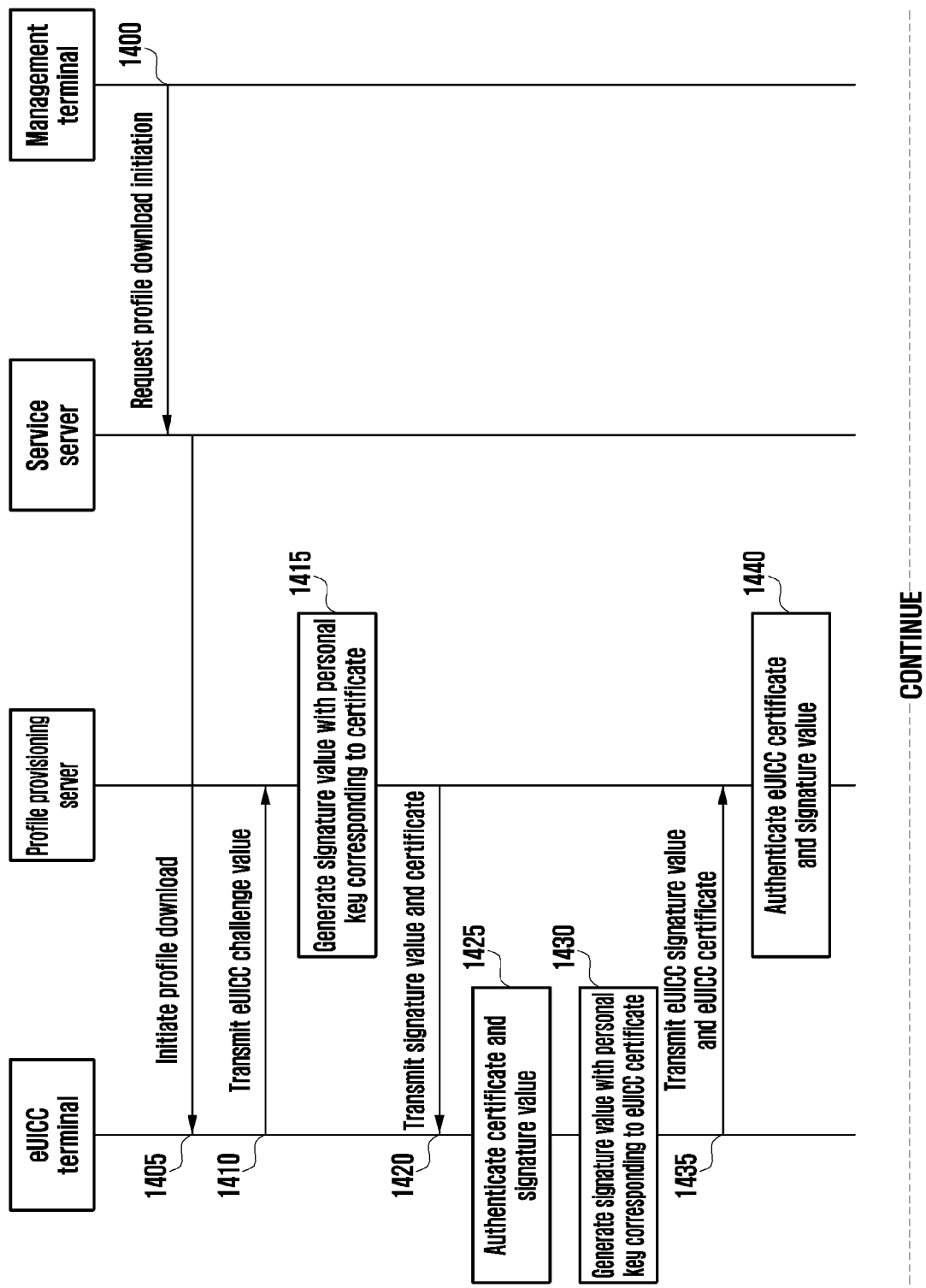
Figures 2, 14A:
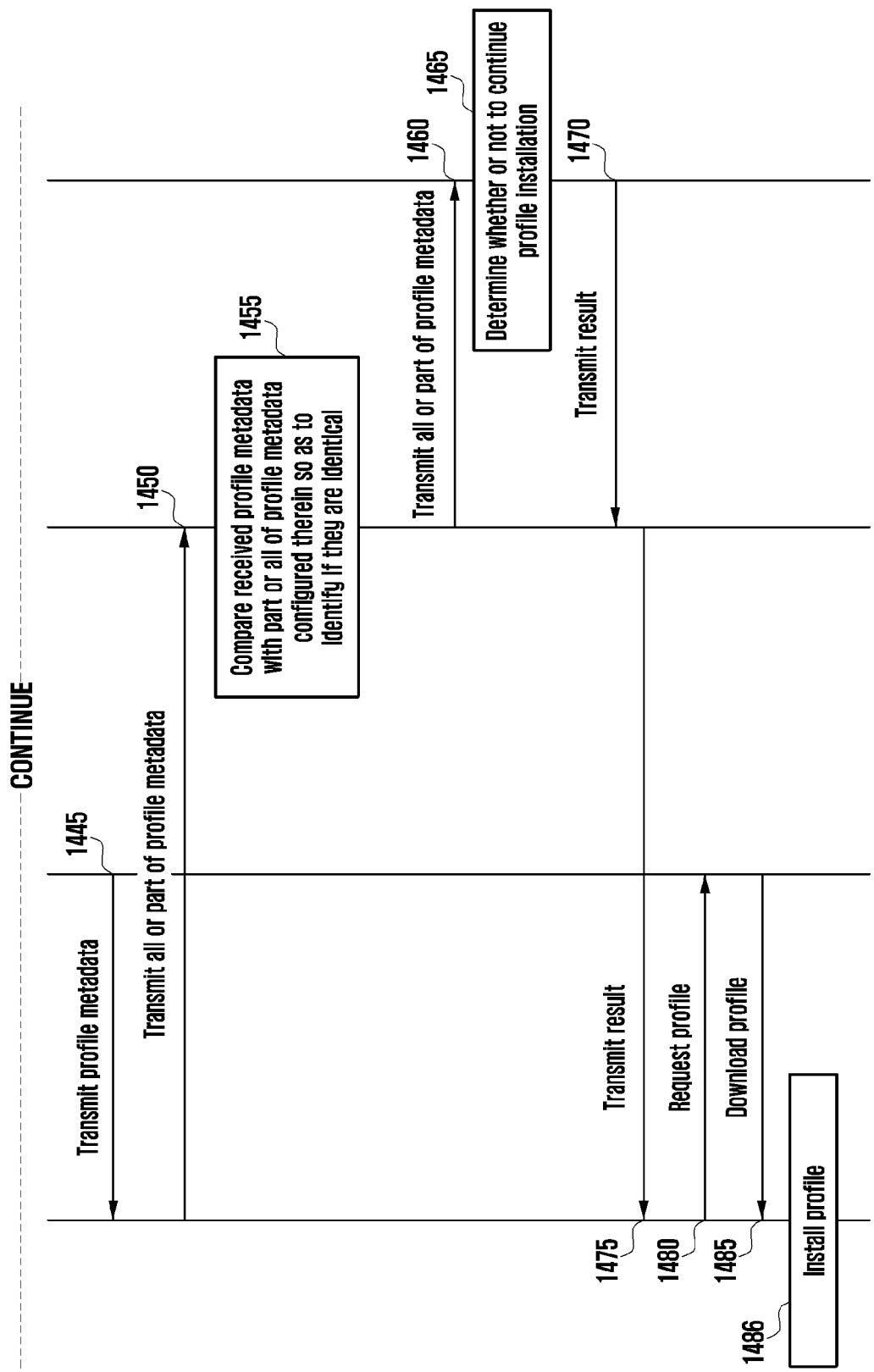
Figure 14B:
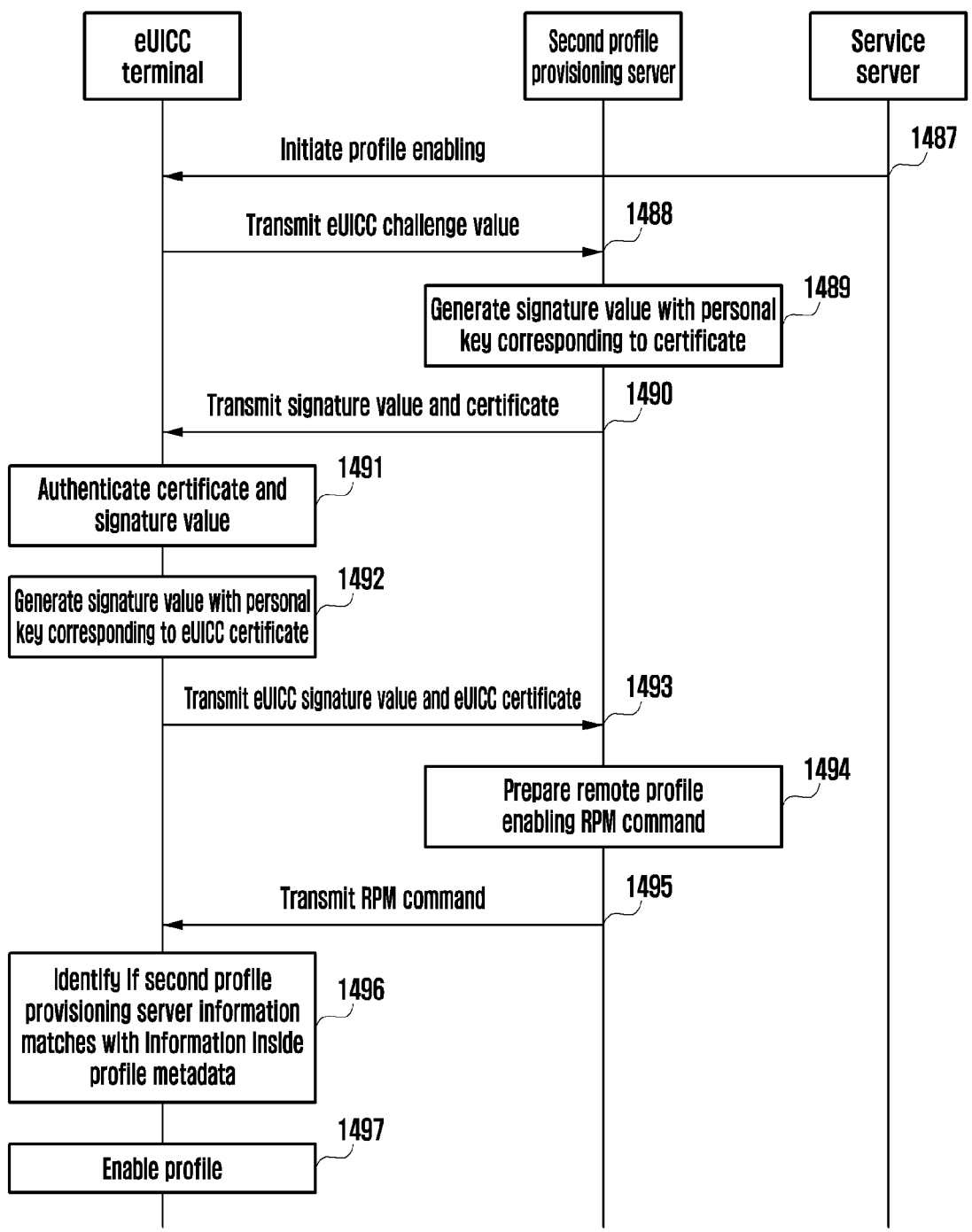
FIG. 14B illustrates a diagram of another method for installing and enabling a profile according to an embodiment.

FIG. 14A-1 illustrates another embodiment of an apparatus and a method for remotely performing profile installation and profile enabling through a remote management server according to an embodiment, FIG. 14A-2 illustrates another embodiment of an apparatus and a method for remotely performing profile installation and profile enabling through a remote management server according to an embodiment, and FIG. 14B illustrates another embodiment of an apparatus and a method for remotely performing profile installation and profile enabling through a remote management server according to an embodiment.

Referring to FIG. 14A-1 and FIG. 14A-2, the manager or user of the eUICC terminal may access the service server (or remote management server) through the management terminal and may input a profile download initiation request through the UI of the management terminal. Accordingly, the management terminal may transmit the profile download initiation request to the service server in step 1400.

Following operations from steps 1405 to 1455 may be identical or similar to steps 1300 to 1350 in FIG. 13A. A detailed description thereof will be omitted herein.

If authentication is successful in step 1455, the service server may provide the management terminal with information regarding all or part of profile metadata in step 1460. Therefore, the management terminal may determine whether or not to conduct profile installation in step 1465. For example, the manager or user of the eUICC terminal may check the content of part or all of the metadata or content corresponding thereto (for example, icon) through the UI of the management terminal, and may determine whether or not to continue profile installation. Alternatively, whether or not to continue profile installation may be determined based on a reference or rule pre-stored in the management terminal.

In step 1470, the management terminal may deliver the result of determination in step 1465, for example, information indicating whether or not to continue profile installation, to the service server. If the received result indicates that profile installation is to continue, the service server may proceed to the next process and, if not, may end the installation process.

If profile installation is to continue, the service server and the terminal may perform steps 1475 to 1486. The procedure from steps 1475 to 1486 may be identical or similar to operations from steps 1355 to 1370 in FIG. 13A. A detailed description thereof will be omitted herein.

FIG. 14B illustrates a diagram of a method for enabling a profile by a terminal according to an embodiment.

Referring to FIG. 14B, following the procedure of FIG. 14A, the service server may deliver profile enabling initiation of the SIM profile installed in FIG. 14A to the eUICC terminal. Steps 1487 to 1497 in FIG. 14B may be identical to steps 1375 to 1389 in FIG. 13B.

Figure 15:
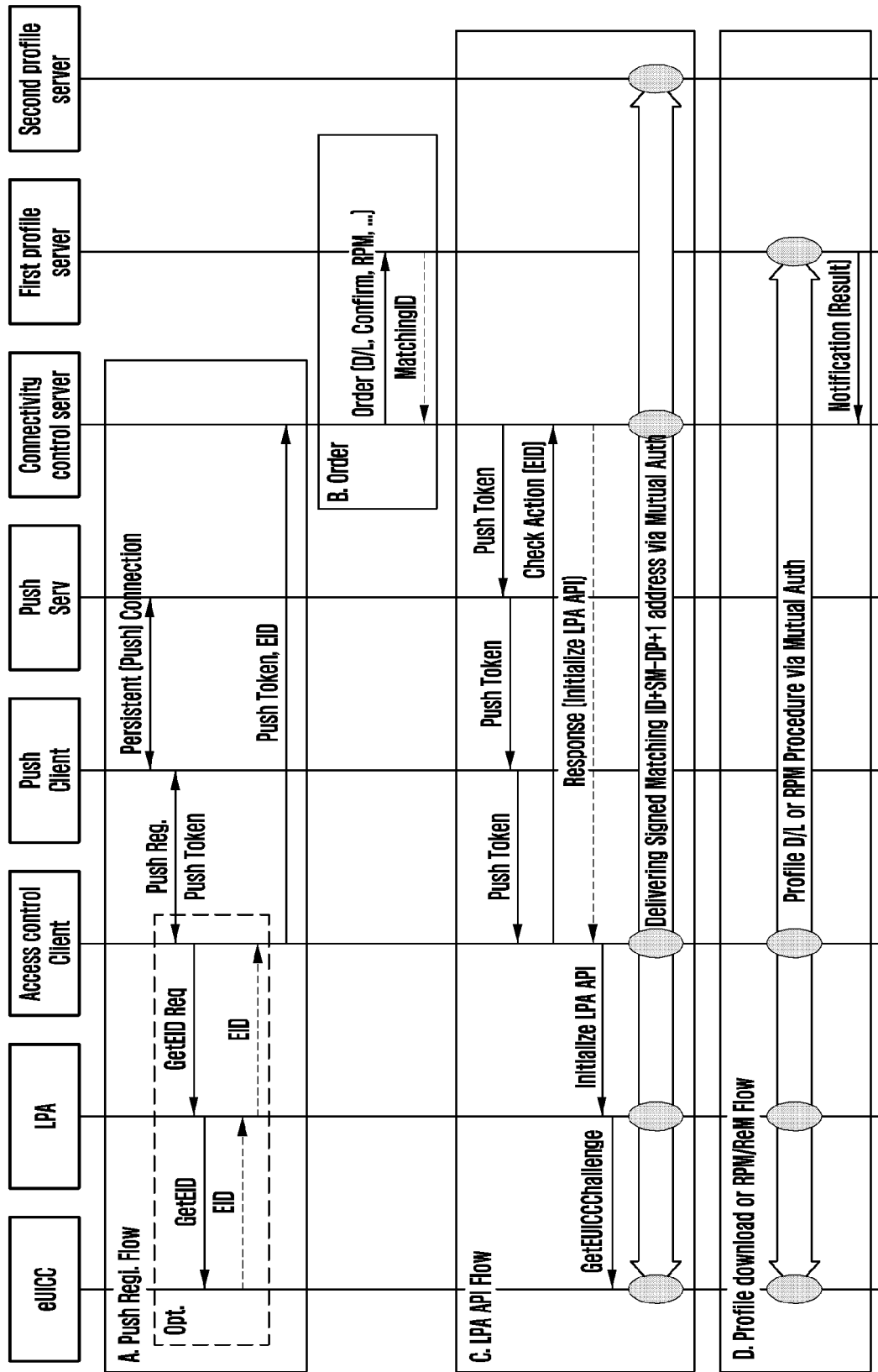
FIG. 15 illustrates a diagram of a more specific operation that may be implemented together with FIG. 12, FIG. 13, and FIG. 14 according to an embodiment.

FIG. 15 illustrates a diagram of a more specific operation that may be implemented together with FIG. 12, FIG. 13, and FIG. 14 according to an embodiment.

Referring to FIG. 15, the eUICC, the LPA, the connectivity control app (used interchangeably with connectivity control client), and the push client may be constituent elements of the eUICC terminal. In addition, a combination of the connectivity control app and the push client, or the connectivity control app alone may be referred to as a service app. In addition, a combination of the connectivity control server and the push server, or the connectivity control server alone may be referred to as the service server (or remote management server).

First, a process of registering the ID corresponding to the eUICC in the service server, prior to step 1200 described with reference to FIG. 12, will be described.

In step A, the eUICC terminal may register the EID in the service server. More specifically, the push client may maintain persistent IP connection with the push server. The push server may be separate from the connectivity control server.

The push client may then provide a push token to the connectivity control client. The connectivity control client may request the LPA to provide the EID. The LPA may then provide the EID to the connectivity control client.

The connectivity control client may then deliver both the EID received from the LPA and the push token to the connectivity control server, thereby registering the EID.

As the terminal registers the EID in the service server in this manner, the service server may transmit a profile initiation request to an appropriate terminal.

Step B corresponds to a step in which, before the service server performs step 1200 in FIG. 12A, step 1265 in FIG. 12B, step 1300 in FIG. 13A, step 1375 in FIG. 13B, step 1405 in FIG. 14A, and step 1487 in FIG. 14B, the service server instructs the first profile server or the second profile server in advance to prepare for profile download or RPM download, and receive a matching ID in response thereto. The matching ID may be delivered to the first profile server or the second profile server in step 1230 of FIG. 12A so as to identify if the first profile server or the second profile server has a profile or RPM to be provided to the terminal.

Step C may correspond to the entire process of step 1200 in FIG. 12A, step 1265 in FIG. 12B, step 1300 in FIG. 13A, step 1375 in FIG. 13B, step 1405 in FIG. 14B, and step 1487 in step 14B, or a partial process thereof.

In step C, the connectivity control sever may initially provide a push token to the push server in order to deliver information to the terminal. The push server may deliver the push token to a push client corresponding to (or connected to) the push token in step A by using the push token.

Then, the push client may deliver the push token to the connectivity control app so as to inquire if the connectivity control app has an operation to handle by providing the EID to the connectivity control server. For example, the connectivity control app may inquire if there is an operation to handle through a check action request.

In response to the check action request, the connectivity control server may deliver the initialize LPA API to the connectivity control client.

Then, the connectivity control client may deliver the same to the LPA, and may deliver the matching ID and the server address of the first profile server or the second profile server to the eUICC terminal thereafter. The matching ID and the server address of the first profile server or the second profile server may be values signed by the signature of SM-DP+2.

The first profile server in FIG. 15 may be the first profile provisioning server or the second profile provisioning server in FIG. 12 to FIG. 14. Likewise, the second profile server in FIG. 15 may be identical to or separate from the first profile provisioning server or the second profile provisioning server in FIG. 12 to FIG. 14.

Following step D is a process of profile download or RPM download. After the profile or RPM download is completed, the first profile server may deliver the result to the connectivity control server.

Although operations related to one eUICC terminal have been described with reference to FIG. 12 to FIG. 15, each of multiple terminals may be managed through the same processes as in FIG. 12 to FIG. 15.

Particularly, large-scale terminals may be managed effectively by using a scheme as in FIG. 12 or FIG. 13.

Figure 16:
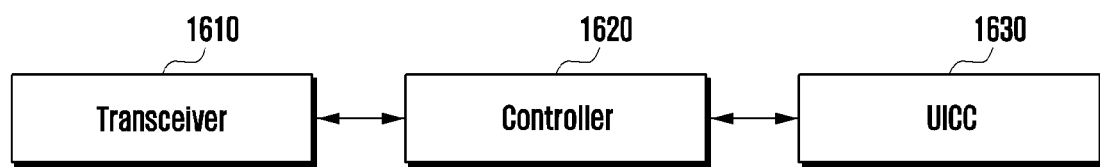
FIG. 16 illustrates a diagram of the configuration of a terminal according to an embodiment.

FIG. 16 illustrates a diagram of the configuration of a terminal according to an embodiment.

As illustrated in FIG. 16, the terminal may include a transceiver 1610 and at least one processor 1620. In addition, the terminal may include a UICC 1630. For example, the UICC 1630 may be inserted into the terminal, or may be embedded in the terminal. The at least one processor 1620 may also be referred to as a controller.

The transceiver 1610 according to an embodiment may transmit and receive signals, information, data, and the like according to various embodiments with a profile server.

For example, the transceiver 1610 according to various embodiments may receive a message including at least a remote management command from the profile server.

The transceiver 1610 according to an embodiment may send a message (handle notification) including a remote management input result to the profile server as a reply.

Meanwhile, the at least one processor 1620 is a constituent element for overall control of the terminal. As used herein, the processor may be defined as a circuit, an application-specific integrated circuit, at least one processor, or a controller. The processor 1620 may control overall operations of the terminal according to various embodiments as described above.

For example, the at least one processor 1620 according to various embodiments may determine if a received remote management command can be handled by the UICC 1630, may input the remote management command to the UICC 1630, may identify if the profile server is included in the manager profile server list in the UICC 1630, may perform remote management in the UICC 1630, may generate a remote management input result, may analyze an error code if the remote management input result includes the error code, may switch the remote management command to a local management command, may input the local management command to the UICC 1630, may perform local management in the UICC 1630, and may switch the local management input result (local management result) to a remote management input result (load RPM package result).

In addition, the at least one processor 1620 according to various embodiments may control the transceiver 1610 so as to receive the remote management command from the profile server, may handle the remote management command, and may transmit the remote management input result to the profile server.

In addition, the processor 1620 according to the disclosure may compare profile metadata received from the service server with all or part of metadata received from the profile provisioning server, thereby authenticating the profile download initiation request of the service server. In addition, in response to a profile enabling request of the service server, the processor 1620 may authenticate information of the profile provisioning server, thereby enabling the profile.

Alternatively, the processor 1620 may transmit all or part of the profile metadata to the service server such that the service server can authenticate the profile download initiation request.

The processor 1620 may also control other operations of the terminal described in the disclosure.

The UICC 1630 according to various embodiments may download a profile and may install the profile. The UICC 1630 may also manage the profile.

The UICC 1630 may operate under the control of the processor 1620. Alternatively, the UICC 1630 may include a processor or a controller for installing a profile, or may have an application installed therein. A part of the application may also be installed in the processor 1620.

Meanwhile, in the drawings illustrating methods of the disclosure, the order of description does not necessarily correspond to the order of executions. The preceding/following relation may be changed, or executions may proceed in parallel.

Alternatively, some constituent elements may be omitted from the drawings illustrating methods of the disclosure, without deviating from the gist of the disclosure, and only some constituent elements may be included.

In addition, in connection with methods of the disclosure, part or all of content included in respective embodiments may be executed in combination without deviating from the gist of the disclosure.

Meanwhile, the terminal may further include a memory (not illustrated), and may store data for operations of the terminal, such as a basic program, an application, and configuration information. The memory may include at least one storage medium selected from a flash memory type, a hard disk type, a multimedia card micro type, a card-type memory (for example, SD or XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). In addition, the processor may perform various operations by using various programs, contents, data, and the like stored in the memory.

Figure 17:
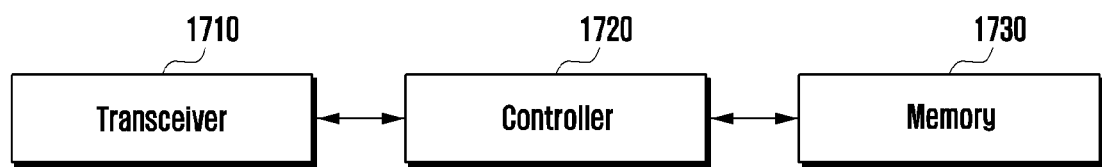
FIG. 17 illustrates a diagram of the configuration of a profile server according to an embodiment.

FIG. 17 illustrates a diagram of the configuration of a profile server according to an embodiment.

Referring to FIG. 17, the profile server may include a transceiver 1710, a controller 1720, and a memory 1730. In the disclosure, the controller may be defined as a circuit, an application-specific integrated circuit, or at least one processor.

The transceiver 1710 may transmit/receive signals with another entity.

The controller 1720 may control overall operations of the profile server according to embodiments proposed in the disclosure. For example, the controller 1720 may control the signal flow between respective blocks such that operations are performed according to the above-described flowcharts.

The memory 1730 may store at least one of information transmitted/received through the transceiver 1710 and information generated through the controller 1720.

Figure 18:
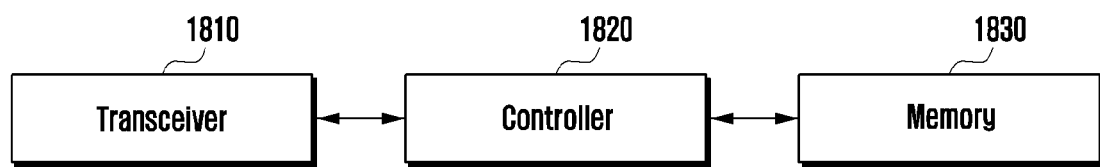
FIG. 18 illustrates a diagram of the configuration of a service server according to an embodiment.

FIG. 18 illustrates a diagram of the configuration of a service server according to an embodiment.

Referring to FIG. 18, the service server may include a transceiver 1810, a controller 1820, and a memory 1830. In the disclosure, the controller may be defined as a circuit, an application-specific integrated circuit, or at least one processor.

The transceiver 1810 may transmit/receive signals with another entity.

The controller 1820 may control overall operations of the profile server according to embodiments proposed in the disclosure. For example, the controller 1820 may control the signal flow between respective blocks such that operations are performed according to the above-described flowcharts.

The memory 1830 may store at least one of information transmitted/received through the transceiver 1810 and information generated through the controller 1820.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Various embodiments and terms used therein are not for the purpose of limiting the technology disclosed herein to a specific mode of implementation, but are to be understood as including various changes, equivalents, and/or alternatives of the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments may be implemented as machine (for example, computer)-readable storage media (for example, software (for example, program) including instructions stored in an internal or external memory). The machine refers to a device capable of retrieving a stored instruction from a storage medium and operating according the retrieved instruction, and may include a terminal according to various embodiments. If the command is executed by a processor (for example, processor 1620 in FIG. 11), the processor may execute a function corresponding to the command directly or by using other constituent elements under the control of the processor. The command may include a code generated or executed by a complier or an interpreter.

The machine-readable storage media may be provided in the form of non-transitory storage media. Here, the term "non-transitory" only means that the storage media is tangible without including a signal, irrespective of whether data is semi-permanently or transitorily stored in the storage media.

Methods according to various embodiments disclosed herein may be provided while being included in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). In the case of online distribution, at least a part of a computer program product may be at least temporarily stored in storage medium such as a memory of a server of a manufacturer, a server of an application store, or a relay server, or may be provisionally generated. Each of constituent elements (for example, modules or programs) according to various embodiments may include a single entity or multiple entities, and some of the above-described corresponding sub constituent elements may be omitted, or other sub constituent elements may be further included in various embodiments. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal including a first embedded universal integrated circuit card (eUICC) in a wireless communication system, the method comprising:
   receiving a request for performing a second function associated with a second eUICC;
   identifying whether the second function is supported by the first eUICC based on at least one of a function list or information on a version of the first eUICC;

in case that the second function is not supported by the first eUICC, determining whether to switch to switch the second function to a first function associated with the first eUICC, which corresponds to the second function and is supported by the first eUICC; and in case that the second function is determined to be switched to the first function, performing the first function, wherein the first function is a local profile management function in case that the second function is a remote profile management function.

2. The method of claim 1, wherein the first function is a function for processing an activation code in case that the second function is a function for processing a command code, wherein the command code is generated by an application installed in the terminal and is used to manage a profile, and wherein the activation code is identified based on the command code.

3. The method of claim 2, wherein the request is transmitted through a terminal response message including at least one remote management command and a digital signature of a profile server, or through a command code execution request message including the command code.

4. The method of claim 1, wherein the determining whether to switch the second function to the first function comprises:

determining whether to switch the second function to the first function based on at least one of a profile server list of a target profile of the terminal, the function list, or the information on the version of the first eUICC.

5. The method of claim 1, wherein the local profile management function is used to change a state of a profile or to update a content of the profile based on software installed in the terminal, and wherein the remote profile management function is used to change the state of the profile or to update the content of the profile.

6. The method of claim 1, wherein in case that the version of the first eUICC is lower than a predetermined version, the second function is not supported by the first eUICC.

7. The method of claim 1, wherein the determining whether to switch the second function to the first function comprises:

performing an additional authentication with a profile server; and determining whether to switch the second function to the first function based on a result of the additional authentication.

8. The method of claim 7, wherein the additional authentication is performed based on whether the profile server is included in a profile server list of the terminal.

9. The method of claim 7, wherein the additional authentication is performed based on whether specific data is included in the request.

10. The method of claim 1, further comprising:

switching a result of performing the first function to a result of performing the second function; and transmitting the switched result.

11. A terminal in a wireless communication system, the terminal comprising:

a transceiver;

a first embedded universal integrated circuit card (eUICC); and a controller coupled with the transceiver and configured to:

control the transceiver to receive (1003) a request for performing a second function associated with a second eUICC, identify (1005) whether the second function is supported by the first eUICC based on at least one of a function list or information on a version of the first eUICC, in case that the second function is not supported by the first eUICC, determine whether to switch the second function to a first function associated with the first eUICC, which corresponds to the second function and is supported by the first eUICC, and in case that the second function is determined to be switched to the first function, perform the first function, wherein the first function is a local profile management function in case that the second function is a remote profile management function.

12. The terminal of claim 11, wherein the first function is a function for processing an activation code in case that the second function is a function for processing a command code, wherein the command code is generated by an application installed in the terminal and is used to manage a profile, and wherein the activation code is identified based on the command code.

13. The terminal of claim 12, wherein the request is transmitted through a terminal response message including at least one remote management command and a digital signature of a profile server, or through a command code execution request message including the command code.

14. The terminal of claim 11, wherein the controller is configured to:

determine whether to switch the second function to the first function based on at least one of a profile server list of a target profile of the terminal, the function list, or the information on the version of the first eUICC.

15. The terminal of claim 11, wherein the local profile management function is used to change a state of a profile or to update a content of the profile based on software installed in the terminal, and wherein the remote profile management function is used to change the state of the profile or to update the content of the profile.

16. The terminal of claim 11, wherein in case that the version of the first eUICC is lower than a predetermined version, the second function is not supported by the first eUICC.

17. The terminal of claim 11, wherein the controller is configured to:

perform an additional authentication with a profile server, and determine whether to switch the second function to the first function based on a result of the additional authentication.

18. The terminal of claim 17, wherein the additional authentication is performed based on whether the profile server is included in a profile server list of the terminal.

19. The terminal of claim 17, wherein the additional authentication is performed based on whether specific data is included in the request.

20. The terminal of claim 11, wherein the controller is further configured to:

switch a result of performing the first function to a result of performing the second function, and control the transceiver to transmit the switched result.

* * * * *